*INVENTOR.*
LAURENCE M. GOODRIDGE
CHARLES L. MARTIN

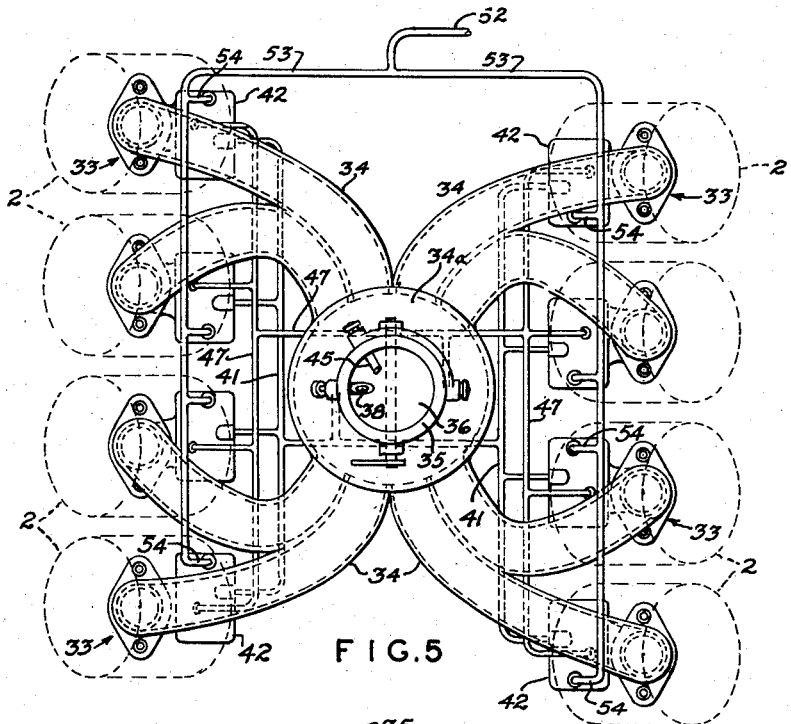
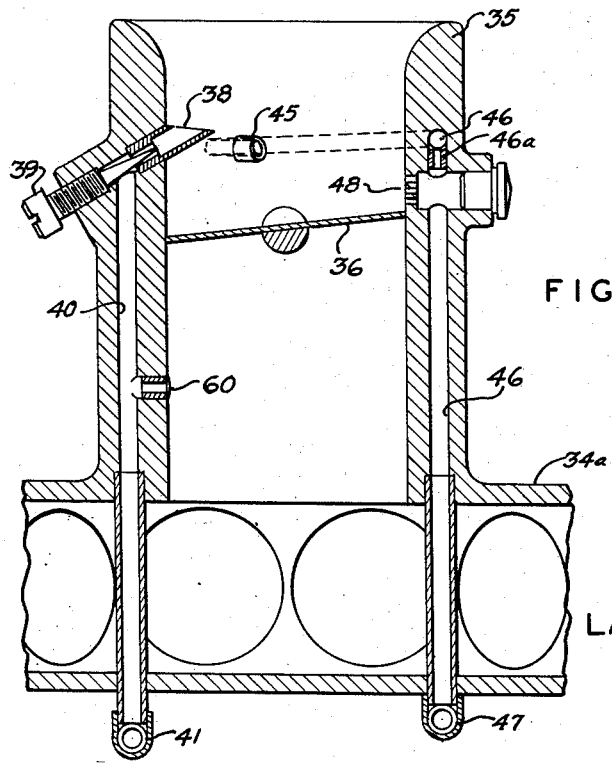

INVENTOR.
LAURENCE M. GOODRIDGE
CHARLES L. MARTIN

Feb. 3, 1959 — L. M. GOODRIDGE ET AL — 2,871,841
PRESSURE INJECTION TYPE CARBURETOR
Filed Oct. 4, 1954

INVENTOR.
LAURENCE M. GOODRIDGE
CHARLES L. MARTIN

Feb. 3, 1959 L. M. GOODRIDGE ET AL 2,871,841
PRESSURE INJECTION TYPE CARBURETOR
Filed Oct. 4, 1954 9 Sheets-Sheet 8

*INVENTOR.*
LAURENCE M. GOODRIDGE
CHARLES L. MARTIN

INVENTOR.
LAURENCE M. GOODRIDGE
CHARLES L. MARTIN

United States Patent Office 2,871,841
Patented Feb. 3, 1959

2,871,841

PRESSURE INJECTION TYPE CARBURETOR

Laurence M. Goodridge, Clayton, and Charles L. Martin, Berkeley, Mo.

Application October 4, 1954, Serial No. 459,976

54 Claims. (Cl. 123—119)

This invention relates to carburation of internal combustion engines. More specifically, the invention relates to a method of carburation which comprises, broadly, first measuring the amount of induction air to the engine, and then injecting a measured amount of fuel to each cylinder in accordance with the amount of air. For carrying out the above steps, a novel air metering device responsive to throttle position and manifold pressure is combined with an injector responsive to engine speed, which operate to inject fuel without the use of costly fuel pumps. Two systems for this purpose were disclosed in our parent application, Serial No. 257,732, filed November 23, 1951, for Pressure Injection Type Carburetor, of which this application is a continuation-in-part. The parent application is now abandoned.

Generally speaking, present systems of carburation employ a carburetor which mixes the air and fuel in measured amounts, and a manifold for conveying the mixture to the individual cylinders of the engine. The carburetors generally used are of the plain tube, downdraft or sidedraft type in which air passing through the tube is controlled by a throttle valve which regulates the amount of air pumped by the engine. The tube contains one or more fuel nozzles and one or more air-metering devices such as venturi. The amount of fuel delivered to the nozzles is measured in accordance with, or directly by, the metering effect of the venturi. This forms a simple and efficient mechanism for controlling the fuel-to-air ratio, which is very flexible in its fuel measuring function over a wide range. The mixture of fuel and air is then delivered to the manifold, and from thence to each individual cylinder.

Theoretically and practically, such a system has several disadvantages, probably the most important of which is that, once the mixture enters the manifold, there is no sure way, as yet discovered, for assuring that each of the cylinders will receive a uniform mixture of fuel and air. This disadvantage flows from several conditions prevailing in the manifold and in the carburetor, some of which are as follows:

In the first place, whereas the air entering the carburetor and passing the nozzles is a steady flow, the condition in the manifold is a pulsating flow, and the mixture is oscillated back and forth within the manifold by the sequential closing and opening of the intake valves of the engine.

Whereas the atomization of the fuel in the carburetor may be relatively complete, once the mixture has entered the manifold, the fuel has a tendency to condense on the cold walls of the manifold. The result is that the fuel streams along the manifold walls like rain down a windowpane until it is picked off the walls by the intake to a particular cylinder. This destroys the proper distribution ratio between cylinders.

Considering the carburetor and its operation, it will be clearly apparent that the carburetor itself is a refrigeration machine on a small scale. The throttle action of the valve produces the drop in pressure and an expansion of the gas into the manifold. At the same time, the atomization of the fuel absorbs heat in its change of state from a liquid to a part gas. Both these effects produce a drop in temperature at a point in the engine cycle which has little benefit upon the volumetric efficiency of the engine. It is now frequently the practice to add heat from the exhaust to the inake manifold to aid in the vaporization of the fuel and offset this refrigerating effect.

Fuel injection systems which deliver fuel directly either to the cylinder itself or to the intake port of the cylinder eliminate the objectionable disadvantages of a carburetor, but are expensive to construct and maintain, and are less dependable in operation than the simple carburetor. It can be readily understood that the construction of a pump which will deliver the minute charge of fuel, which is all that is required by an engine during idling, and be capable of delivering maximum fuel charge under heavy load and high speed conditions, presents a difficult engineering problem. It is believed that for these reasons that, in spite of their advantage over the usual carburetor system, fuel pump injection systems as yet do not appear economically feasible.

The present invention seeks to combine some of the advantages attained by fuel injection with a carburetor system. Considering broadly the induction to each cylinder of the engine, it is apparent that, on the intake stroke, as the piston starts downwardly, air will begin its movement into the cylinder either immediately or slightly subsequent thereto. The induction of air will continue at a rapidly increasing rate as the piston goes beyond midstroke, and then decrease gradually in velocity until the intake valve closes, at which time the intake air will be dammed up, so to speak, by closing of the valve, which will produce instantaneously at the valve a higher pressure due to the inertia in the column of air flowing to the cylinder. The direction of flow will then reverse in order to dissipate the pressure and seek equilibrium with the pressure prevailing in the manifold generally.

This invention seeks, as one of its objectives, to use this pulsation in the flow at the intake valve to cause an injection of fuel. During pulsation, the air will reach much higher velocity at the intake port than at any other place in the system, and the differentials in pressure during this pulsation can be readily employed to initiate the injection, and then to terminate the same. Accordingly, the nozzles for delivering the fuel injection in the present invention are located adjacent the intake ports of the engine, where they will be subject to these rapid and extreme variations in pressure, and where the fuel delivered will be injected primarily to the cylinder, whereby distribution may be accurately regulated.

The method and apparatus of this invention provides for atomization of the fuel at a point where the refrigerating effect of subsequent evaporation may be utilized directly in the cylinder for cooling and for increasing the engine volumetric efficiency. In the method and apparatus of this invention, the injection takes place at a point remote from the throttling action of the throttle valve, thereby making the addition of heat to prevent icing wholly unnecessary.

According to this invention, a manifold is provided for delivering air alone to each of the cylinders of the engine, and the regulation of pressure and the amount of air pumped by the engine is controlled by a valve or valves adjacent the intake of the manifold.

According to this invention, open fuel nozzles are provided exposed to the pulsating flow within the manifold adjacent the intake valves of the engine and more or less remote from the valve or valves controlling the flow of air into the intake of the manifold.

According to this invention three distinct systems may be employed to control the flow of fuel in the nozzle.

In the first system a source of pressure varying from negative to positive with throttle opening can be applied to the fuel in the nozzle to balance static pressure (suction) in the manifold acting on the fuel in the nozzle. Since the static pressure in the manifold is a function of throttle opening and engine speed, this source of pressure is a differential pressure means which will effect changes in the degree of suction as a function of these same variables. The first system can be referred to as control by pull on the fuel.

In the second system a source of pressure varying from positive to negative with throttle opening can be applied to the fuel in the nozzle to balance static pressure (suction) in the manifold. This source of pressure, like the first, is variable, and an inverse function of the same variables that control static pressure in the manifold. This second system can be referred to as a system of control by push on the fuel both toward and away from the open nozzle.

The third system is a combination of the push and pull systems above described.

According to this invention, a source of positive pressure is provided adjacent the throttle and connected with the nozzle for operation under varying conditions, such as when the throttle is partially to wholly closed. This source of pressure will cause the fuel in the nozzle to be picked off in small amounts sufficient for low-load conditions on the engine, as at idling, cruising, etc.

According to this invention, a means is provided at the air metering point which is responsive to low-load conditions to decrease the richness of the mixture of fuel delivered to the cylinders.

According to this invention, means is provided adjacent the air metering means responsive to overload and high load conditions on the engine at both low and high speeds to increase the richness of the mixture.

According to this invention, a means is provided to act to eliminate this source of pressure after the throttle is opened a predetermined amount requiring larger amounts of fuel.

It is the object of this invention to provide a system of carburation for an internal combustion engine which has the advantages of a fuel injection system combined with the advantages of a simple carburetor, and without the disadvantages attaching to either one.

It is an object of the invention to provide a carburetor which has all the advantages of a fuel injection system and the simple construction of a carburetor without the disadvantages of either a carburetor or fuel injection.

Other objects will appear as the description proceeds.

A structure and method is hereinafter described which will carry out the purposes set forth above.

We have chosen to illustrate the invention by its application to a conventional V-8 engine of the overhead valve type common in the automobile art. It will be understood, however, that the invention may be applied, when suitably modified, to any type of engine, and that the particular engine chosen is purely arbitrary and for purposes of illustration only.

The illustrated form of this carburetor has been shown on a scale and in a form which can be readily understood by those skilled in the art, but the form illustrated is by no means considered to be a commercial design, and was chosen merely to best represent the relation of the parts of the carburetor with respect to the manifold and engine.

In the drawings, Figs. 1, 2, and 3 are schematic illustrations of the arrangement of elements in three different systems according to this invention. All mechanical metering devices have been omitted. For simplicity, each illustration shows only a single discharge for connection with an intake port or ports to one or more cylinders.

Fig. 5 shows the carburetor of this invention in full lines, and the engine in phantom top plan view.

Fig. 6 is a vertical section through a portion of the carburetor transversely of the engine, illustrating one form of the air intake.

Figures 1, 2, 3:
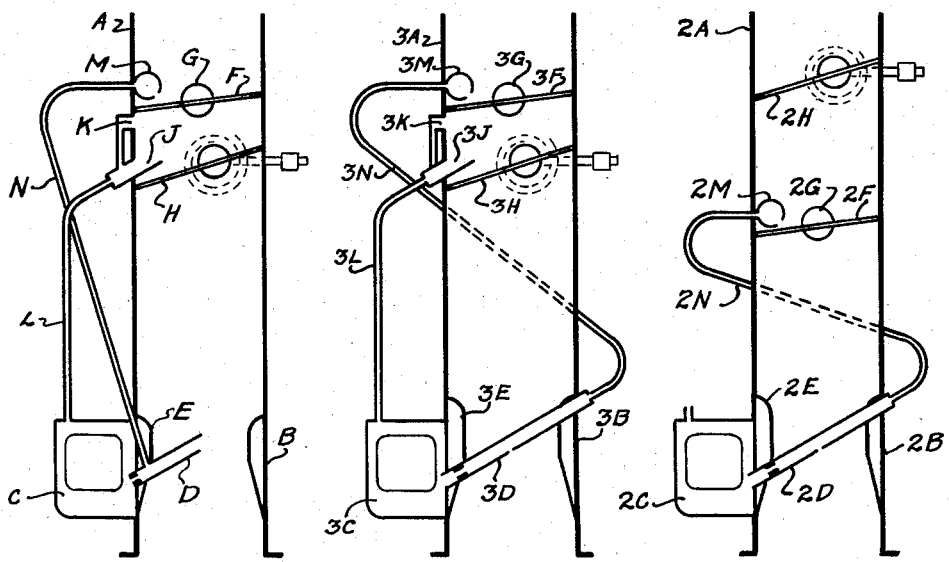
Fig. 1 illustrates a system in which the fuel is exposed to a source of pressure varying from negative to positive with throttle opening (a suction system).
Fig. 2 illustrates a system in which the fuel is exposed to a source of pressure varying from positive to slightly negative with throttle opening (a pressure system).
Fig. 3 illustrates a combination of the first and second systems (a push-pull system).

Turning now to Fig. 1, in this schematic showing the air intake stack A is connected directly to a fuel injector unit B, only one of which is shown. In the preferred form of this invention, a fuel injector unit B is provided for each intake port of the engine or each pair of intake ports, and the intake stack A is connected separately to each fuel injection unit B by a branched manifold. Each fuel injection unit has a float bowl C containing a float for operating a valve in the fuel supply connection for the bowl. A nozzle D connects with the fuel supply in the bowl and projects into a venturi nozzle E.

In the air intake stack A is a manually controlled throttle valve F mounted on the shaft G. Below the throttle F is an unbalanced pressure responsive automatic valve H. The shaft supporting valve H is biased to closed position by either an eccentrically mounted weight or a coiled thermostat spring responsive to engine temperatures, or both. The degree with which the valve H resists opening in response to engine suction will vary with engine temperature, and also in response to the degree of opening movement of the valve due to the action of the unbalanced weight. Regardless of how the valve control is adjusted to respond to suction of the engine, it will create between it and the throttle valve F a zone of modulated pressure in small degree higher than that at the fuel injector nozzle D except at normal engine operating temperatures with throttle F in the wide-open range and at high engine speeds. The valve H has no effect when nearly wide open.

Within this zone of modulated pressure created by valve H is a nozzle J which faces the air stream past throttle F. A port K connects with nozzle J and, in turn, with the sealed fuel bowl C by way of tube L. At small openings of the throttle F a stream of air is directed into port K to increase the pressure in tube L and in the fuel bowl. Larger degrees of throttle valve opening produce the same effect on nozzle J.

Above throttle F and located opposite shaft G is a tube M arranged tangentially of the intake stack. An opening is provided in tube M for sensing the pressure in the air stream past the throttle. As throttle F is opened, a venturi is formed between the upper surface of valve F and the lower surface of tube M. When valve F is opened further, this distance will increase, and eventually the throat of the venturi is formed by the tube M and throttle shaft G. At closed throttle the pressure in tube M will be atmospheric, or substantially so, and air will flow through tube N to lift the fuel from nozzle D. The venturi action between the throttle F and tube M will decrease the flow through tube N as the throttle is opened. The amount of decrease will depend upon engine speed. At top engine speeds at wide open throttle the fuel will be raised in the tube N. It is possible to have tube M act as an auxiliary fuel nozzle if desired.

In the system above described, the fuel is metered as a function of several variables by an air metering means measuring the flow past the throttle F, and by a flow measuring means which varies as the engine speed or pulsation at nozzle D, by manifold pressure or load on the engine, and by engine temperature. This will be described in more detail hereinafter.

The system schematically represented in Fig. 2 is a second system operating with positive pressures on the fuel in the nozzle. The same elements are indicated by the same reference characters with the prefix (2). The description of the elements will be confined to the difference in structure and arrangement from Fig. 1.

In the air metering unit 2A is a throttle 2F on shaft 2G opposite tangential nozzle 2M. The position of unbalanced valve 2H and throttle 2F are reversed. The means for controlling unbalanced valve 2H can be the same as above described for valve H.

In the fuel injector unit 2B the fuel nozzle 2D connects at one end with the fuel bowl and at the other with a line 2N from the nozzle 2M. The fuel bowl is vented to atmosphere or to the air intake stack above the valve 2H.

In this system the fuel is metered in accordance with the four variables, throttle opening, engine speed, engine load, and engine temperature.

With the engine at normal temperature, valve 2H will either be wide open or at least have little or no resistance to opening so that it has little effect and the same air pressure will exist on top and bottom.

At engine idle, with throttle 2F closed or only cracked open, a high suction will exist below the throttle. Nozzle 2D is exposed to this suction, but not the fuel in the nozzle. Air at atmospheric pressure at the nozzle 2M will flow down the line 2N and out the nozzle 2D. By adjusting the metered openings in the two nozzles, the air pressure on the fuel in the injector nozzle can be controlled to balance the pressure acting on the fuel through the vent in the float bowl to control the pressure drop across the fuel metering restriction located between the fuel bowl and nozzle outlet. When properly calibrated, the fuel level raises close to the opening in the injector nozzle so that some is continuously atomized and swept out of the nozzle by the static pressure effect in the local high air velocities adjacent the hole in the inector nozzle 2D. The drop in pressure at this hole is large, and velocities will be exceedingly high. Atomization of the fuel will result, producing a fine mist for charging the engine.

As the throttle opens, the pressures at nozzle 2M will decrease as air velocities at the throat between the throttle 2F and the nozzle 2M increase. This increase is gradual because the venturi so formed is variable up to the point when the throat is formed with the shaft 2G. The decrease in pressures in nozzle 2M raises the fuel in the injector nozzle 2D so that more and more fuel is available by increasing the pressure drop across the fuel metering orifice at the bowl outlet. This effect can be adjusted to supply fuel to nozzle 2M if desired.

When the air flow through the injector unit increases due to throttle opening, more fuel is available in the injector nozzle 2D. If the flow past the nozzle 2D is a pulsating one, the fuel will be forced out of the nozzle in timed relation, lowering the fuel level in the nozzle each time.

The engine temperature controls valve 2H to increase the fuel supply by raising the fuel level in the injector nozzle by increasing the pressure drop across the fuel metering orifice and drawing additional fuel from nozzle 2M if necessary.

Fig. 3 schematically illustrates the push-pull arrangement which combines the systems of Fig. 1 and Fig. 2. The same parts are indicated by the same reference characters with the prefix 3. This system provides modulated, inversely variable pressures according to air flow in the intake stack. One source of pressure is connected to the fuel bowl vent, and the other to the injector nozzle. The system can be adjusted so that the pressure connected to the vent controls fuel metering in one range of throttle openings and engine speeds, and the pressure connected to the fuel injector operates only in another range, or both may be effective continuously. In any case the rate of fuel flow is proportional to the pressure drop across the orifice between the nozzle and bowl. The bias on the valve 3H may be one which progressively decreases with valve opening, in which case the pressure system on the injector nozzle would be the exclusive control at large throttle openings. On the other hand, when nozzle 3M is merely a port to bleed atmospheric pressure and not a venturi, then the system can be adjusted by decreasing the metering of the suction bleeds connected to the vent on the fuel bowl to make the pressure system on the injector nozzle control the fuel during idle only.

Figure 4:
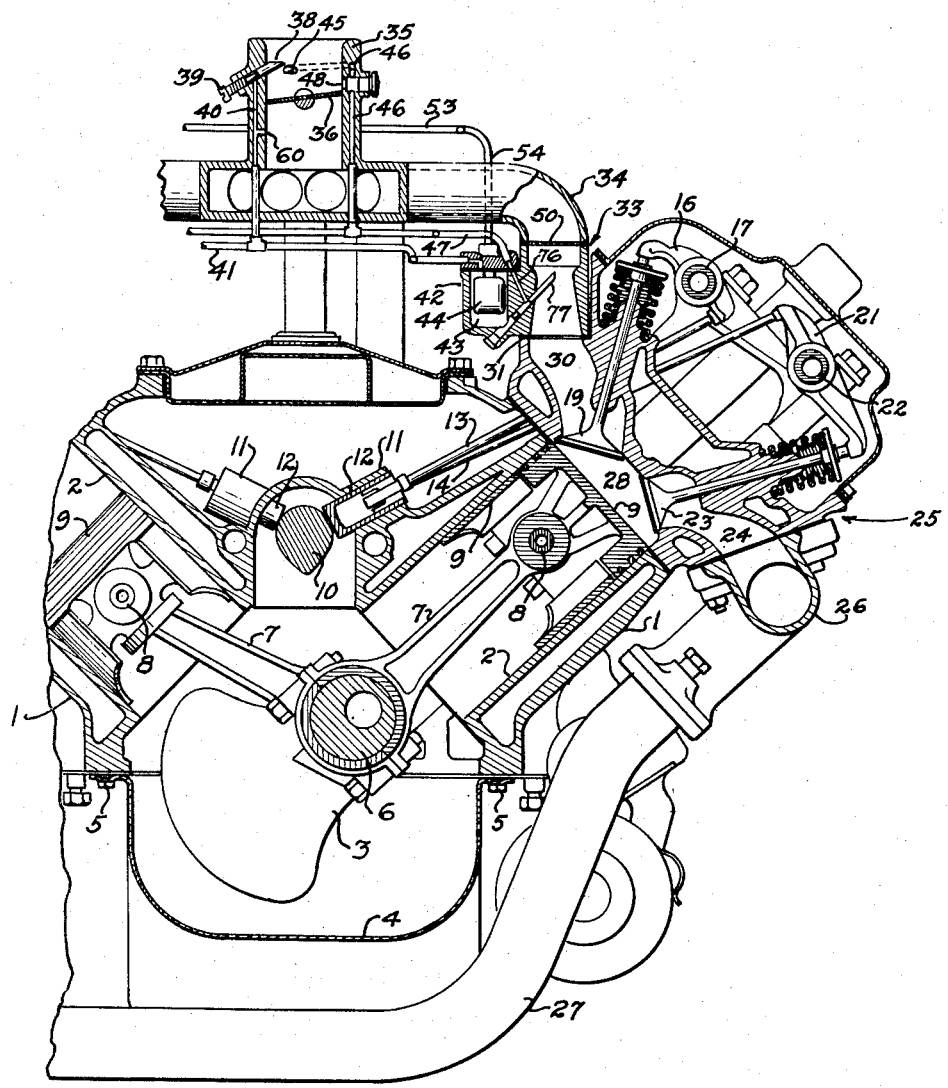
Fig. 4 illustrates a carburetor of this invention mounted on a V-8 engine shown in section.

Referring to Fig. 4, there has been illustrated a V-8 engine comprising cylinders 2 mounted in an engine block 1. In such engines it is usual to mount the crankshaft 3 adjacent the intersection of the center lines of the cylinders, and to provide a crank case 4 containing the oil. The crank case is attached to the main engine block 1 by the usual studs 5. To each throw of the crankshaft 6 are journaled the connecting rods 7 which carry wrist pins 8 mounting thereon the pistons 9.

Between the banks of the cylinders is a camshaft 10 driven from the crankshaft 3 in the usual manner by gears or chains (not shown). Enclosing the camshaft 10 is a casing containing the valve push rod guides 11, one for each valve to be operated. Cam followers 12 are mounted in these guides, and, as shown, are the usual hydraulic type. Operated from these followers are the usual valve push rods, one for each valve. The intake push rods are indicated as 13, and the exhaust push rods as 14. The valve push rods are guided in the head of the cylinder by means not shown. Each, in turn, engages a rocker arm for operating the valve. Push rod 13 operates rocker arm 16 rotatably mounted on a journal 17. Intake valve 19 extends at an angle to the cylinder, and its stem is engaged by the rocker arm 16 for actuation in timed relation with cam on camshaft 10. Exhaust valve push rod 14 operates rocker arm 21, which, in turn, is mounted rotatably upon a journal 22. Its opposite end engages the outer end of the stem of the exhaust valve 23 for actuation of the exhaust valve in timed relation with the cam on camshaft 10.

Valves, rocker arms, and stems are all mounted in a cylinder head 25, which is shown mounted upon cylinder block 1. The manner of connection is not particularly pertinent to this invention, and so is neither shown nor described. The cylinder head 25, however, contains a firing chamber 28 and oppositely entering intake and exhaust passages 30 and 24 from the firing chamber, controlled by valves 19 and 23. The exhaust passage is indicated as 24, and this passage registers with an exhaust manifold 26 bolted to the outside of the cylinder block. Exhaust manifold 26 is connected, in turn, with the exhaust system of the engine indicated as 27.

To the engine above described in general terms is applied the carburetor of this invention, using the system in Fig. 1. As before mentioned, intake valve 19 controls an intake passage 30 leading through the cylinder head to the firing chamber 28. Intake passage 30 connects with intake port 31 on the opposite side of the cylinder head from the exhaust port. In the usual constructions, the manifold connects the carburetor with each of these intake ports. According to this invention, however, an injection nozzle unit is positioned adjacent the intake port and between the manifold 34 and the intake port 31. The injection nozzle unit is generally indicated as 33 and will be described in detail further. Manifold 34 contains a plurality of branches leading to each of the injection nozzle units, and is provided with an air intake stack 35, which acts as the air intake for the entire system, and this stack is provided with the air control devices which comprise a throttle valve 36, manually controlled, and a series of ports acting as a source of ram intake air and of suction, located anterior to and posterior to the manually controlled throttle valve 36.

Anterior of the throttle valve is a system comprising a ram air intake port and an internal nozzle 38 provided with a needle valve 39. From this nozzle a passage 40 leads down the side of the stack and connects with an internal port 60 posterior of the throttle. Passage 40 is provided with a connection to the line 41 leading to each float bowl of the injection units. Only one of the float bowls is shown in Fig. 4, but each is identical, so a description of each one is not particularly necessary. A description of one will serve for all.

Line 41 connects with the cover of the float bowl 42, and thence with the float chamber 43. The chamber contains the usual float 44 and float valve for controlling the entrance of fuel into the float chamber in order to maintain therein a constant level of fuel. Returning, now, to the air intake stack 35, a second ram air inlet 45 internally of the stack 35 connects by a passage 46 with a second internal port 48, both of which are located anterior to the throttle valve 36. Port 48 is so located as to be swept by the edge of the valve 36 as it swings toward open position. This changes the character of the action of the port 48 from a source of atmospheric pressure when the valve is closed, to a source of suction when the valve is partially open. Passage 46 extends down the side of the intake stack and connects with a line 47 extending to each of the fuel nozzles in the injection units. The particular purpose of this connection will be later described. It is sufficient to state now that this particular connection is a source of positive pressure when the throttle is closed, and supplies the air to the nozzle of the injection device.

It will be noted that the manifold 34 is slightly enlarged at its point of connection with the injection device, and adjacent this connection is provided a screen 50 of suitable mesh to straighten the air flow before it enters the injection device.

Turning now to a top plan view of the system as shown in Fig. 5, each of the cylinders of the engine is shown in phantom view at 2. Connected to the cylinders is a manifold 34 having a branch for each intake port for each cylinder. Each branch in turn connects at its opposite end with a distribution chamber indicated as 34A in a manner so that the distance from the chamber to each intake port is substantially uniform. Centrally of the chamber is a stack 35 as described with respect to Fig. 4. This intake air stack contains the throttle 36, ram air ports 38 and 45, and suction ports (not here shown) located below the manually controlled throttle valve 36. The system of pipes comprising the lines 41 are shown to have headers with leads which connect with each of the float bowls of the injection units 33. Likewise, the system of piping indicated as 47 in Fig. 4 consists of transverse pipes connected with headers having branches leading to each of the fuel injection nozzles for each cylinder. As shown perhaps better in Fig. 5, fuel is supplied to each of the float bowls for each injection unit by a supply line 52, which connects by a transverse line 53 to headers extending along the engine, and provided with branches 54 connected to supply fuel to each of the float bowls.

In a commercial adaptation of the present invention, it is contemplated that all of these lines may be formed integral with the manifold system, thereby eliminating the piping and the possible development of leaks. The incorporation of these lines in the manifold castings would also be desirable to keep the fuel cool and shield it from the heat of radiation from the engine cylinders.

Turning now to Fig. 6, which shows the air intake stack in enlarged transverse section, a better realization of the location of the ports in the side of the air intake with respect to the manual throttle may be obained. As above explained, the float chamber of each of the fuel bowls for each of the injection units is sealed from the atmosphere except through the bowl pressure control duct 41, which, in turn, connects with a vertical passage on the side of the air intake stack. The passage 40 may be provided with a restriction of some kind to meter the flow of air, or, on the other hand, the metering passage may be in the port 60 and in the ram intake opening connected with this passage 38. In any event, the conduit 41 connects directly with the intake passages 38 and 60. Conduit 47 connects directly with the injection nozzles and extends vertically of the air intake stack 35 to ram air intake 45 and port 48 connected directly therewith. Port 48 may be located immediately anterior to the throttle valve 36 when the throttle valve is in a closed position. Thus port 48 is swept by the edge of the throttle valve during the throttle opening movement from dead idle, and thereafter part or all of port 48 is exposed to pressure prevailing in the stack for the purpose of reducing the volume of air bled to the nozzle of the injection device. The effect of this action upon the amount of fuel injected will be discussed hereinafter.

Turning now to a consideration of the function of the nozzle 38 in port 60, it can be seen that the pressure imposed upon the fuel in the bowl within the float chamber will be a function of the differential pressures imposed upon the nozzle 38 and port 60. In other words, with throttle 36 closed, the fuel will be subject to full suction pressure posterior to the throttle, modified to some exent by the leakage of air at atmospheric pressure through the nozzle 38. This differential in pressure may be controlled by the adjustment of the metering needle 39 and the fixed metering orifice at 60, whereby the resulting pressure on each of the fuel bowls may be minutely controlled.

In this position of the throttle, atmospheric pressure will be supplied through the conduit 47 to each of the fuel injection nozzles, due to the fact that both ports 45 and 48 are exposed to atmospheric pressure.

As the throttle gradually opens, the pressure in conduit 41 will rise accordingly, due to the drop in suction adjacent the port 60 and increase in ram pressure from the nozzle 38. On the other hand, as the throttle gradually opens, more of the port 48 will be subject to the air sweeping about the edge of the throttle valve 36. Consequently, the pressure in conduit 47 will decrease until the throttle reaches about half way, when approximately intake stack pressure will prevail within the conduit 47.

When the throttle approaches wide open position, conduit 41 will be supplied with full ram air pressure from the nozzle 38. Some, of course, will bleed off through the opening port 60, but substantial atmospheric pressure will be approached to an extent depending upon the amount of restriction of needle valve 39. Conversely, as the throttle 36 reaches full open position, ports 48 and 45 will be subject to slight suction. This will cause the fuel to rise slightly in these passages, and the result will be a gradual decrease of the supply of air to the injection nozzle with throttle opening until the throttle reaches its near wide open position, at which time the injection nozzle will be full of solid fuel, due to suction effect of the ports 45 and 48 tending to lift the fuel in the conduit 47. Generally speaking, the pressures in conduits 41 and 47 will be reversed for any throttle position. As the description proceeds, it will become apparent how this differential in pressures in the conduits 41 and 47, together with the other effects, provide an injection system for supplying the correct amount of fuel at all times, depending upon manifold pressure and ambient air condition.

Figure 7:
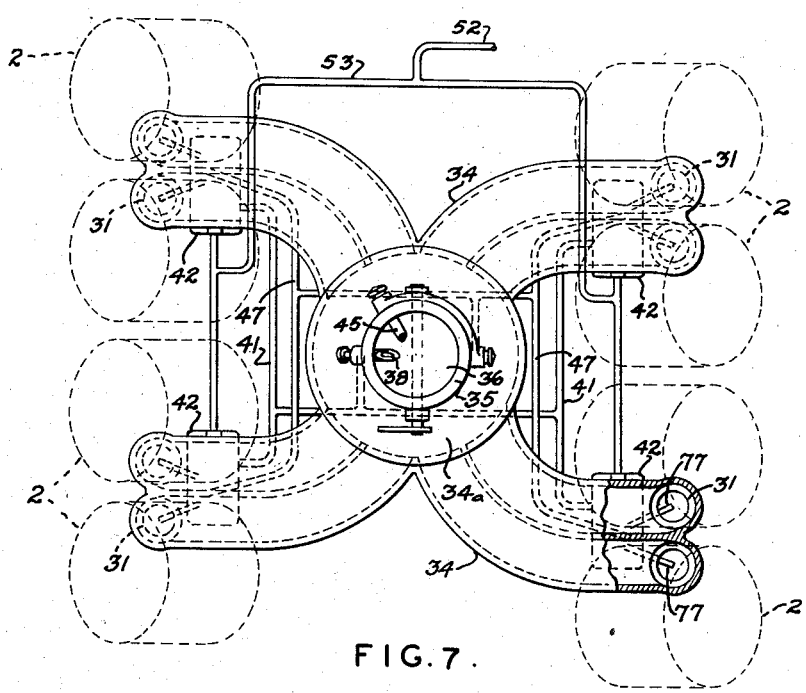
Fig. 7 is a top plan view illustrating the carburetor according to this invention with respect to the cyinders of a V-8 engine in phantom view. This view illustrates a modification adapted to an engine having adjacent pairs of intake ports.

In Fig. 7 is shown a top plan view of an engine equipped with a carburetor corresponding to our invention. The difference between this view and that already discussed (Fig. 5 above) is that in this particular V-8 engine the intake ports are next adjacent one another grouped in pairs. Similar reference characters will be used to indicate like parts in this embodiment. The cylinders are indicated as 2, and the intake ports for each of the cylinders are grouped in pairs and are shown in phantom view at 31. Connected to each of the intake ports are separate branches of the manifold 34 leading to a distribution chamber 34A. Central of the distribution chamber is an air intake stack 35. This, in turn, contains the throttle 36 and the ports 38 and 45 in the same relation to the throttle as described in detail with respect to Fig. 6. The system of ports is connected by a similar manifold system comprising a plurality of conduits 41 leading from nozzle 38 and port 60 (not shown) to the fuel bowls of the injection devices. In a like manner, conduit 47 connects port 45 and port 48 with each of the nozzles of the injection devices. A fuel supply line 52 connects with a transverse supply line 53, which, in turn, is connected to supply fuel to each of the fuel bowls 42. In this particular embodiment, since the intake ports 31 are adjacent, each fuel bowl 42 contains two nozzles 77. These will be later described in detail.

Figure 8:
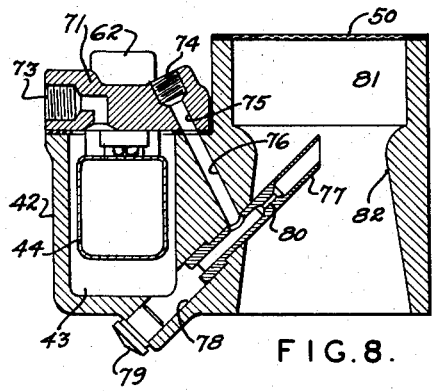
Fig. 8 is a view in transverse section of a fuel injection unit usable in the carburetor shown in either Figs. 4 or 7.

Fig. 8 shows one of the injection devices according to this invention. The injection device is generally indicated at 33, and comprises a float bowl chamber 43. Within the float bowl chamber is a float 44 for controlling a needle valve which seats in a housing 62 to which the main fuel supply line 53 is connected. The float chamber itself is sealed to atmosphere by a cover member generally indicated as 71 securely attached to the top of the bowl. This cover member contains a fuel line connection generally indicated as 62 and above mentioned. It also contains a connection for the line 41 generally indicated as 73. This connection has a passage communicating directly with the float chamber 43. The float bowl cover also contains a connection 74 for the lines 47, which, in turn, has a passage 75 leading to a passage 76 in the main portion of the injection unit, which, in turn, connects with the main fuel nozzle 77 intermediate the ends thereof. The fuel nozzle 77 is pressfitted, or the like, into a bore 78 in the main body of the injection unit, which bore is closed at one end by a plug 79, and is in open communication with the float chamber 43. The main fuel nozzle is constructed with a metering passage 80 spaced toward the air intake side of the unit from the passage 76, and also from the tip of the fuel nozzle 77. This metering passage 80 will control the amount of fuel flowing into the enlarged section of the nozzle at the tip thereof. The injection unit also comprises the air intake passage generally indicated at 81. At the entrance thereof is a screen 50 of suitable mesh to provide for flow straightening and for other purposes to be described later. The lower portion of the air intake part of the fuel injection unit may be provided with a venturi such as indicated at 82 so located with relation to the fuel nozzle 77 that its throat portion is coincidental with the opening in the main fuel nozzle. The fuel injection unit of Fig. 8 may be a single venturi type, or it may take the form of a double venturi type as shown in top view of Fig. 9.

Figure 9:
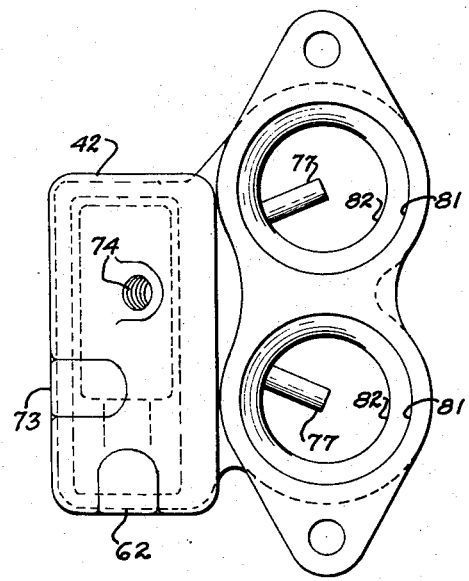
Fig. 9 is a top plan view of the fuel injection unit adaptable to the system shown in Fig. 7.

Fig. 9 shows a double type of fuel injection unit such as is useful in the embodiment shown in Fig. 7, where the intake ports are adjacent one another. The screen members have been omitted from this view in order to give a full idea of the location of the fuel nozzle with respect to the fuel chamber and float bowl. The float chamber is exactly similar to that in Fig. 8, but the unit is provided with twin air intake units 81 provided with separate venturi 82. At the throat of each venturi is located a fuel nozzle 77, and, in order that the two fuel nozzles may be supplied from a single fuel chamber, such as 43 in Fig. 5, the nozzles have bores which are angularly related so as to draw from a common source at the same fuel level, regardless of the inclination of the engine in the chassis or inclination of the car as a whole.

Figure 10:
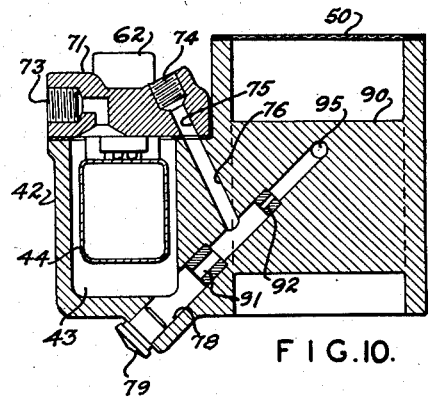
Fig. 10 is a transverse cross-sectional view of a fuel injection unit adaptable to the system shown in Fig. 5 or Fig. 7.

Fig. 10 shows a modification of another type of fuel injection unit, which unit is provided with a streamline strut similar to that commonly used in the strut type of carburetor. In this modification the float chamber is indicated by 43, and within the float chamber is a float 44 for controlling the usual needle valve (not shown) for fuel level control. The unit 42 also includes a cover for the float bowl indicated as 71, in which are provided the separate bores 62, 73 and 74 for connection with the fuel lines and air lines, all as previously described with relation to Fig. 8. For this reason similar reference characters are used to indicate like parts in this view.

Referring specifically to Fig. 10, a streamlined strut 90 is provided within the air intake passage, at the entrance of which is mounted a screen 50 of suitable mesh. A bore 78, closed by a plug 79, extends from the fuel bowl upwardly on an incline within the strut 90. Within the bore 78 are two metering orifices 91 and 92, one either side of the air supply passage 76. The bore 78 extends to a point adjacent the maximum chamber of the strut 90, and is there provided with a fuel outlet 95 extending to either side face of the strut 90.

Figure 11:
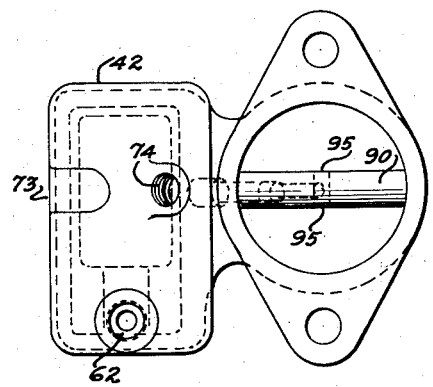
Fig. 11 is a top plan view of the fuel injection unit shown in Fig. 10.

Referring to Fig. 11, the general relationship of the parts described in Fig. 10 is shown in top plan with the screen removed for a better view of the strut. It can be seen here that the strut 90 substantially bisects the air intake, and, in the case of a single injection unit of the type described, is substantially rectilinear with respect to the fuel bowl. However, in case the strut type of injection unit appears desirable in the twin unit type, the struts may take the relationship of the fuel nozzles 77 in Fig. 9 within twin air intake openings of the fuel injection device of Fig. 11. The specific construction of the fuel injection units themselves may take any of a number of conventional forms, two of which have been shown, and applicants do not desire to be restricted to the two specific forms shown, the idea being simply that two have been illustrated to show that more than one form is contemplated.

The design of the particular fuel injection units as shown is not believed to be critical to the invention, for the reason that a venturi or strut may or may not be necessary to produce the desired results. This all depends upon the particular characteristics of the engine to which the invention is applied. Other modifications will readily occur to those skilled in the art, depending upon the particular characteristics of the engine.

It is likewise pointed out that applicants contemplate different arrangements of the air intake stack and manifold. Although only two types of manifolds have been shown, it is wholly possible that it may appear advantageous to mount the air intake stacks horizontal as tubes extending the length of each bank of cylinders with the throttle valve controlling one or both ends, and with openings in the stack leading to each of the fuel injection devices. In such an arrangement, the two throttle valves 36, if the engine is of the two-bank type, may be linked for unitary movement in synchronism, and separate control passages provided in each stack. It is also possible that in any of the manifolds auxiliary velocity throttles may be used.

It is also contemplated that in any commercial embodiment of this invention, it may be deemed desirable to provide separate control passages, one to the ram intake port 38 and connected with the fuel bowl of each unit, and the other from port 60 and extending in like manner to each of the fuel bowls. Such a construction might be advantageous to vent the vapors and gases from collecting in each of the fuel bowls directly into the air intake stack, and thereby prevent the interference of bubbles of gas entering through the line 52 from affecting the metering of the fuel by the ports 38 and 60.

Operation of the device

The engine shown is supplied air for combustion through the intake stack 35. The amount will be under control of the throttle valve 36 in the stack. Air passing the valve enters the generally cylindrical distribution chamber 34a, and is pumped into the individual cylinders through branches 34. At the exit ends of the branches a screen of suitable mesh may be provided to straighten the flow and insure that air flow is more uniform across the inlet area to the injection unit.

Fuel is supplied to each float bowl of each injection unit through fuel lines 53, and a near constant level is maintained in the fuel bowls by the use of a float valve to supply fuel to the nozzles 77.

When the intake valve of a cylinder opens, which generally occurs before the piston reaches top center preceding the intake stroke, the exhaust valve is also open to some degree, and air will begin to flow past the fuel nozzle and through the injection unit due to the aspirating effect of the exhaust gases past the exhaust valve. Air pressure in the locale of the nozzle 77 will begin to drop as air moves from the manifold through the injection unit past the intake valve. After the piston starts down on the intake stroke, the exhaust valve closes and the cylinder begins to pump air at a rapidly increasing rate. This rate usually increases until the piston passes mid-stroke, and then it is believed that it decreases until after the piston passes bottom center, or until the intake valve closes, which is usually timed to occur in this part of the stroke.

It is well understood that the increasing rate of flow will be accompanied by a similar drop in static pressure in the air stream as it flows to the cylinder. This drop in static pressure in the stream may be augmented further by using a venturi or the like in the injection unit, although such a device may be unnecessary to the functioning of the unit to inject the fuel.

After the intake valve closes, the air flow is dammed, so to speak, and will reverse its flow direction locally adjacent the intake valve. This, in turn, raises air pressure locally in the adjacent injection unit around the fuel nozzle.

These pulsations in the air stream adjacent the intake valve will be modulated in large degree by the stretch of air in the manifold so as to occur later and in much smaller degree at the intake stack except at wide open throttle for low speeds. Under such conditions these pulsations, on reaching the stack, can be used to terminate injection.

This cycle of pressure changes adjacent the intake valve will produce similar pressure changes in the injection unit. It can be readily seen that pulsations in air pressure here will produce like pulsations of the fuel level in the nozzle, and these pulsations will be in timed relation to the opening and closing of the intake valve.

To those skilled in the art it will be apparent that the amount of fuel injected from the nozzle 77 into the cylinder by each pulse can be controlled in several ways, and this invention employs two distinct methods to accomplish this result.

The first method is performed by a means provided to control the mean level or range of levels of the fuel in the nozzle. The terms "mean level" and "range of levels" are employed because the pulsating air pressures in the injection unit produce a like effect in the fuel level in the nozzle, and the fuel will bounce or pulsate above and below a mean level or within a range of levels with respect to the nozzle. At the upper level or upper part of this range, fuel will be injected into the air stream directly to the cylinder and thus, by controlling the mean level or the range of pulsations of the fuel with respect to the nozzle, the duration of the injection with respect to the cycle of air pressure changes can be accurately controlled. Although in the means disclosed the pressure on the fuel is varied, it is believed that actually it is the duration of the fuel injection with respect to the air intake cycle that accurately controls the ratio of weight or amount of fuel to weight or amount of air, and not the head of pressure on the fuel in the nozzle.

The second method used is performed by a means provided to control the weight or density of the fuel charge injected by the nozzle 77. It will be readily apparent to those skilled in the art that, if the nozzle is maintained full of fuel, the volume for a given time of injection for a given air cycle will be maximum. On the other hand, if the engine requirements for fuel decrease, a corresponding decrease in weight of fuel injected may be attained, other conditions remaining the same, by lowering the density of the fuel in the nozzle.

There are, no doubt, many ways in which varying the density of the fuel, or its effect, may be attained, but, according to this invention, fuel density in the nozzle is controlled by bleeding air into the nozzle to form an emulsion of air and fuel.

Thus it can be readily understood by one skilled in the art that, by controlling the amount of air mixed with the fuel in the nozzle 77, the density of the fuel injected can be accurately controlled. By controlling density, actually the weight of liquid injected on each charge is controlled. Such a means has a distinct advantage over the first means above described in that it provides a fuel regulator capable of very fine control and suitable for low engine loads such as at idle and for closed throttle engine compression braking.

When these two methods of controlling the amount of fuel for each injection are combined, a close control is possible throughout throttle range for all load and speed conditions demanded of the engine. The present invention combines the two means by association of both, with a common control for supplying air to the system, in this instance a mechanically controlled manual throttle valve, in a manner more specifically described hereinafter. When so combined, both of these means are responsive to air flow past the throttle for each throttle position, in a manner generally described as follows:

For idling condition of the engine, it is desirable that the duration of the fuel injection be very brief, or, if continuous, then small, since the amount of air consumed by the engine is small and only a small weight of fuel is required. Accordingly, when the throttle is closed or only cracked sufficient for idle operation of the engine the first means is responsive to air flow effects produced by throttle positions to lower the range of fuel levels or mean level in the nozzle so that the duration of the injection is very brief. At the same time the second means is responsive to air flow effects produced by throttle position to bleed air into the nozzle and mix with the fuel therein at near maximum capacity so that the tip of the nozzle contains a mixture of air and fuel to decrease the weight of fuel injected. This air bleed also imposes a pressure tending to impede the flow of fuel, especially in the device of Fig. 10, where the bleed is located below the metering orifice 92. The two means are calibrated to inject the proper weight of fuel for satisfactory engine operation. Any tendency of the fuel to flow toward the throttle is intercepted by the screen and will be vaporized by the pulsation of the air flow.

For engine compression braking, the conditions above described for idle prevail, except that the weight of fuel per injection decreases in this system due to conditions in the flow of air past the throttle and the increase in manifold depression to give a leaner mixture under these conditions than at idle.

For part throttle operation of the engine, it is desirable that the mixture be lean to give economical operation. Naturally, the weight of fuel required is greater in proportion than at idle, consequently the period of fuel injection during the air intake cycle must be increased. To increase the duration of injection, the first means is responsive to air flow effects produced by throttle position to raise the mean level of fuel in the nozzle. At the same time, in order to lean out the mixture, the second means is responsive to air flow effects produced by throttle position to bleed air into the fuel in the nozzle to decrease the weight of fuel per injection. The effectiveness of the second means is generally decreased as the throttle opens from the idle position.

For operation of the engine at greater throttle positions than those above, it is desirable that the mixture be increasingly richer than at part throttle. Furthermore, it is natural to expect that the weight of fuel required is greater in proportion than at part throttle, and, consequently, that the period of fuel injection during the air intake cycle be progressively increased. To increase the duration of the injection, the first means is responsive to air flow effects produced by throttle positions to progressively raise the mean level of fuel in the nozzle from the part-throttle range. These air flow effects at the throttle will be substantially the result of a steady flow at higher speeds, but, at low speeds, the pulsations at the throttle will occur subsequent to those at the intake port. This will tend to terminate the injection, and may be utilized to increase the duration. At the same time, in order to increase the richness of the fuel, the second means is responsive to the air flow effects produced by increased throttle openings to decrease the bleeding of air to the fuel in the nozzle until at some position of the throttle before full open, not only is the supply of air cut off, but the means becomes effective to ensure a solid column of fuel in the nozzle.

For acceleration at any engine speed, as where the throttle is tipped wide open or nearly so, it is desirable to increase the duration of the injection to maximum and at the same time insure that the nozzle is full of solid fuel. Accordingly, the first means is effective to raise the mean level of fuel to maximum while the second means is immediately effective to reverse its bleeding of air into the nozzle and remove the air and vapors therein to produce solid fuel in the nozzle.

It is realized that, during the above explanation, the second means has been referred to as controlling the richness of the mixture. This was merely for the purpose of convenience in the explanation, for the purpose of distinguishing one means from the other, because it is well understood that the first means controlling the duration of the injection would also control the richness of the mixture. Actually, the second means should probably be regarded as a fine adjustment for the first means, and the two are balanced one against the other to give proper fuel ratios for engine requirements throughout the entire throttle range.

Considering the first of these means, the actual structure comprises the ram air intake port 38 and the port 60 in the side of the intake stack below the throttle. It can be readily seen that these two openings will provide a differential source of pressure for the line 41 leading to each of the fuel bowls. Therefore the pressure in the line 41 will be a function of pressures in two separate zones affected by the intermediately located throttle valve 36. Pressure on ram intake 38 will be atmospheric or a function of atmospheric pressure and velocity of the air passing through the air intake stack above the throttle valve 36, whereas the pressure at port 60 will vary from sub-atmospheric manifold pressure, when the throttle valve 36 is closed, to a pressure indicating a static air pressure condition in the stack, under full throttle conditions. A total pressure in the line 41 will therefore be a function of the pressures of air ram intake at 38, and of manifold static pressure at 60, below the throttle valve. Since the two are connected and also provided with metering passages, one of which is adjustable, any function of the pressures can be obtained by the volume flowing through the two ports. The result will be an infinite number of ranges of pressures which can be obtained, all of which bear a direct relation to the amount of air flowing through the intake stack. Since line 41 connects directly to the top of the fuel bowl, an adjusted differential of these pressures may be imposed directly on top of the fuel within the bowl, thus controlling the range of levels or mean level height of the fuel within each of the fuel nozzles 77. Because the amount of fuel in the nozzle is very small as compared with the amount within the fuel bowl, the level of the fuel in the bowl will not be greatly affected by the imposition of the pressures in the line 41, but will generally be controlled by the respective float valves.

Considering the second means, the actual structure comprises ports 45 and 48 with their connecting passages 47 leading to each of the fuel nozzles. Ports 45 and 48 are located within the range of influence of throttle valve 36, so that both will be exposed to near atmospheric conditions for closed positions of the throttle. Consequently, at any throttle position for slow or fast idle of the engine, these ports will be subject to stack pressures above the throttle. These positions will give maximum air bleed to the nozzles.

As the throttle opens, more and more of port 48 will be subject to the low static pressures which will exist in the stream at the edge of the throttle. Pressure in passage 47 will be a function of the different pressures at ports 45 and 48, and this function is controlled by a metering restriction in the passage 47. Accordingly, pressures in line 47 will decrease with throttle opening until a point is reached when a slight depression is produced to cause, in turn, lifting of the fuel in line 47. This will insure that the nozzles are full of solid fuel.

A structure has been described which will carry out all the objects of the invention. In the carburetor device of this invention, the fuel to air ratio is controlled by metering a near steady flow of air to the engine to control the mean level of fuel in a nozzle exposed to a pulsating flow which produces in that nozzle movement of the fuel in timed relation to the air intake cycle, and the fuel pulsations, in turn, produce an injection of fuel which is picked off the nozzle during each period when the velocity of the air pulsation to the engine is near maximum to insure a fine division of the fuel in the cylinder. It will readily be recognized that the device specifically described so far is an embodiment of the invention corresponding to the system shown and described broadly in Fig. 1. In this preceding detailed description, suction connected to the fuel bowl vent is the means for controlling the mean fuel level in the nozzle. The atmospheric bleed in this embodiment is used exclusively for controlling the density of the fuel in the nozzle, except in one species using the injector unit of Fig. 7. Here it was pointed out that the atmospheric bleed had two functions. Besides forming an emulsion, it also produced a back pressure due to the small size of the metering jet 92, so as to hold the fuel at a lower level in the nozzle. The next embodiment described is a device functioning exclusively in this manner according to the system shown in Fig. 2.

Figure 12:
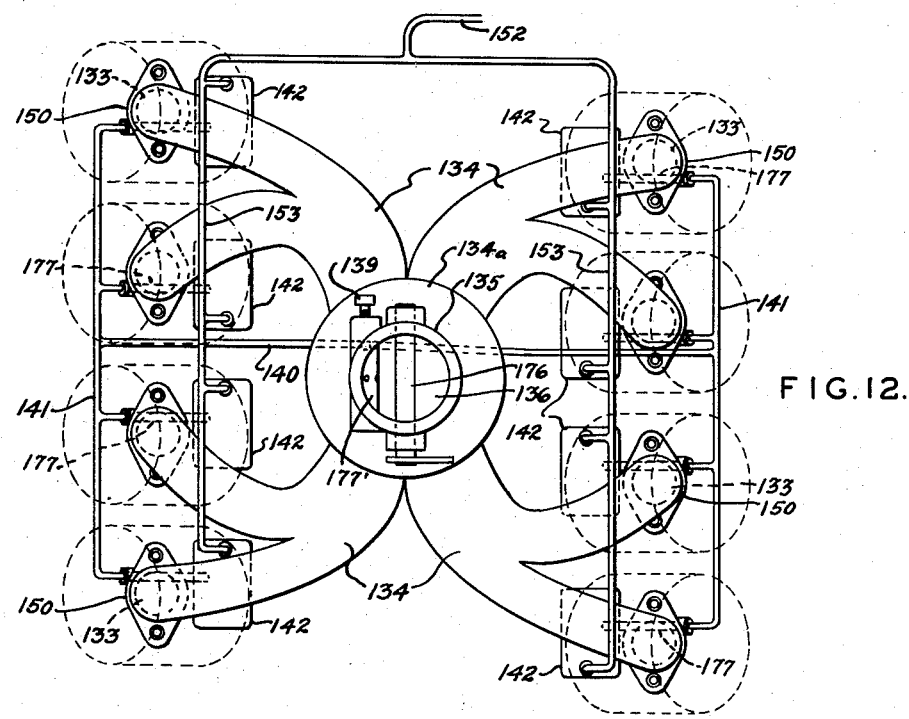
Fig. 12 is a top plan view of an injection system schematically illustrated in Fig. 2.
Figure 13:
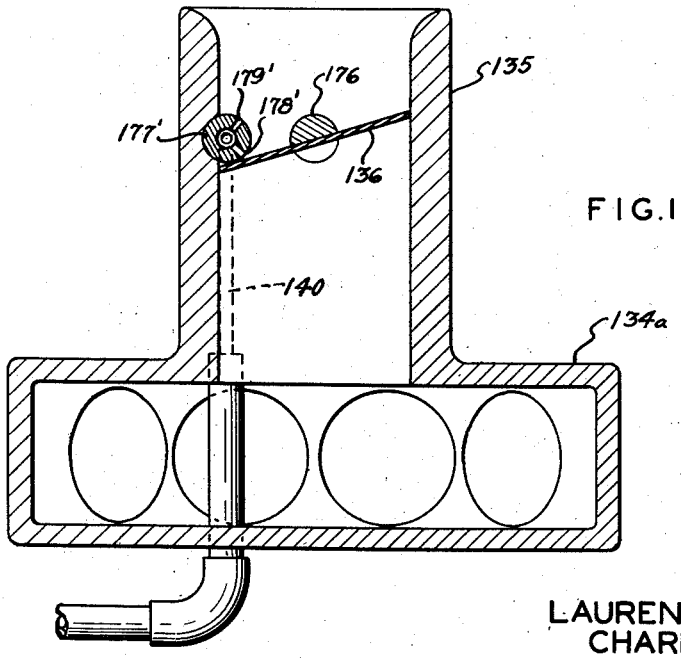
Fig. 13 is a side elevation, partly in section, of an air intake stack for use in Fig. 12.

In the diagrammatic illustration in Figs. 12 and 13, a series of engine intake ports 133 are each provided with a fuel injector unit 150. These units are specifically described hereinafter, but can be generally referred to here as comprising a fuel supply 142 and a throat registering with the intake port containing an injector nozzle 177. The nozzles themselves are tubes located in the throat, with an opening for injecting the fuel.

Each unit 150 has a float bowl 142 connected by a supply line 153 to the fuel pump line 152.

Air is supplied to each injector unit by way of branches 134 leading from a surge tank 134a mounting an intake stack 135. A throttle valve 136 is fixed to a shaft 176 journaled in the walls of the intake stack 135. Opposite the throttle shaft 176 and parallel to it is a tube 177' having pressure sensing apertures 178' and 179' in its exposed wall facing the throttle and shaft 176.

This construction provides a means to sense the velocity of flow around the throttle, which will be a measure of flow. The throat formed between the tube 177' and the throttle face is a variable restriction for small throttle openings, while the restriction between the tube 177' and shaft 176 is a fixed restriction for greater throttle openings. One or both of the sensing openings 178' and 179' may be variable. In this case, a variable restriction for the opening 178' is shown in the form of a needle valve 139.

A passage 140 connects with tube 177', and connected to it is a manifolding 141 with branches leading to each of the injector nozzles 177.

Figure 14:
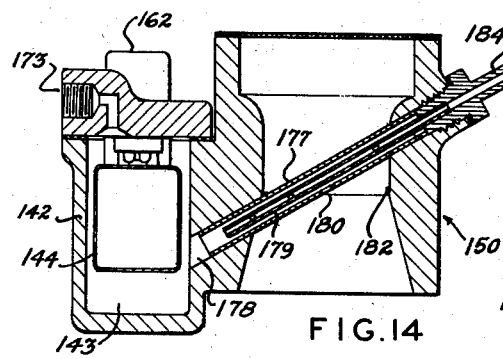
Fig. 14 is a side elevation in section of an injection unit for use with the system shown in Figs. 12 and 13.

In Figs. 14 to 20, inclusive, are shown various forms of injector units 150 which may be used in the system shown in Figs. 2, 12 and 13. The float bowl 142 (Fig. 14) has a connection 162 for the fuel supply 153 (Fig. 12) which is controlled by a valve actuated by float 144 to maintain a constant level in chamber 143. A bowl vent connection 173 is connected to an atmospheric pressure source. In Fig. 14 the injector unit has a venturi-shaped throat 182 in which is disposed an inclined tube 177 with a fuel nozzle 180. Fuel from the bowl passes from the bowl 143 into the tube 177 at one end. The other end of the tube 177 has a connection 184 for the line 141 in Fig. 12 or 2N of Fig. 2. A ported bleed tube 179 extends into tube 177 from connection 184.

Figure 15:
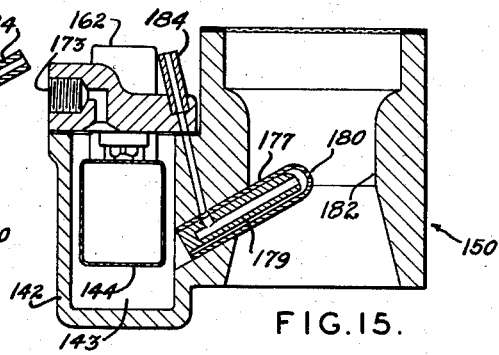
Fig. 15 is a side elevation in section of an air intake stack for use with the combined pressure-suction or push-pull system, or for either one.

The unit in Fig. 15 is similar, except that the bleed tube 179 extends upwardly to a point adjacent the port 180. Connection 184 supplies air from tube 140 in the intake stack. In this form, air pressure within the nozzle tip controls fuel flow.

Figure 16:
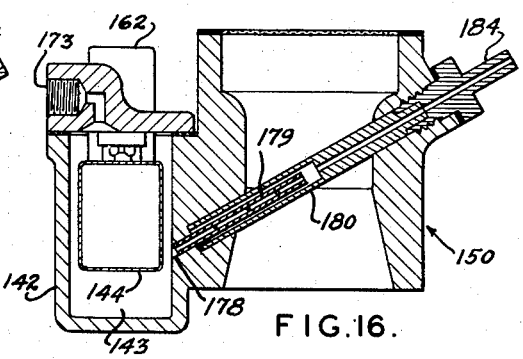
Fig. 16 is a side elevation in section of an injection unit for use in the system shown in Figs. 12 and 13.

The unit in Fig. 16 is similar to that in Fig. 14 except that the ported bleed tube 179 connects with the fuel bowl at 178, and the air will enter the ports in the bleed tube 179 to mix with the fuel as it flows to port 180.

Figure 17:
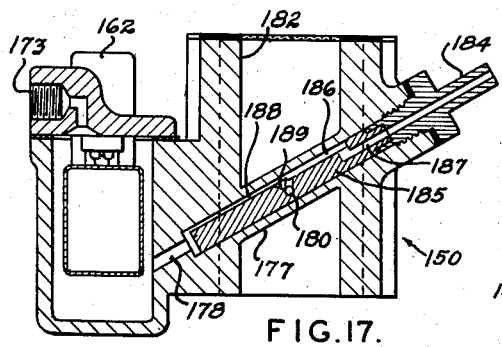
Fig. 17 is a side elevation of an injection unit for use in Figs. 12 and 13, on section line x—x of Fig. 18.

In Fig. 17 the tube 177 contains a metering rod 185 with a passage 187 registering with connection 184. Rod 185 is milled flat to form two steps 188 and 186 above and below the fuel nozzle 180. A tapered notch 189 extends from nozzle 180 to the surface of lower step 188. At low speeds, the fuel will be controlled by the lower step, and at idle by the metering of notch 189. At high speed the fuel level may raise in tube 177 and at each injection will flow to the nozzle 180 from above.

In between injections, the passage provided by flat 186 will be filled with sufficient fuel for the next injection.

Figures 18, 19:
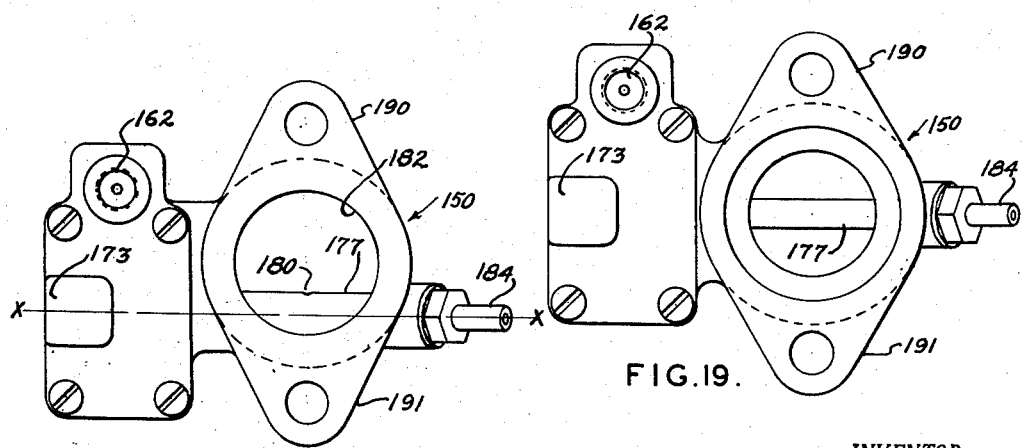
Fig. 18 is a top plan view of the injector in Fig. 17.
Fig. 19 is a top plan view of the injector of Fig. 16.
Figure 22:
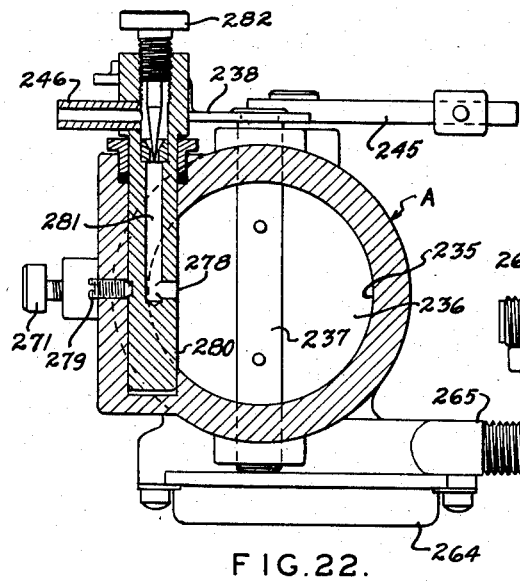
Figs. 22 to 25 are views illustrating a modified form of intake stack.

Fig. 18 is a top view of the injection units of Fig. 17. This view clearly illustrates the tangential relation between the throat 182 and the tube 177. This arrangement can be used instead of a venturi.

Fig. 19 is a top view of Figs. 14–16 and illustrates the position of tube 177 and the ears 190, 191 to secure the air intakes to the injector unit and to the engine intake ports.

Figure 20:
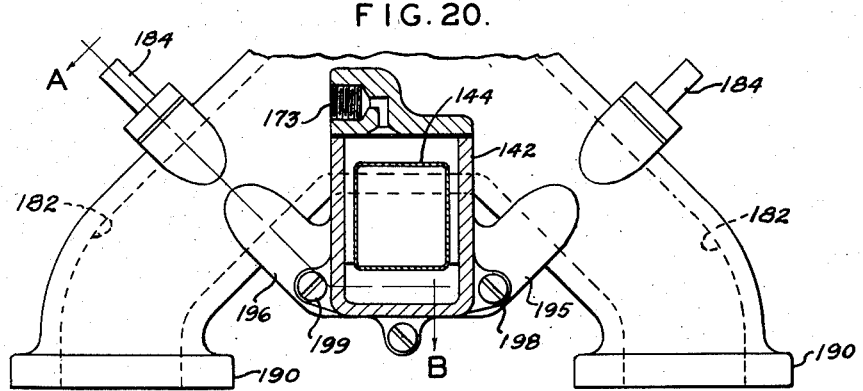
Fig. 20 is a side elevation, partly in section, of a twin injector unit for the pressure system of Figs. 12 and 13.
Figure 21:
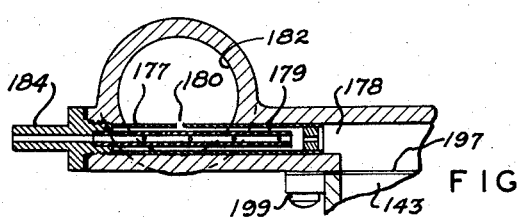
Fig. 21 is a section on the line A—B of Fig. 20.

Figs. 20 and 21 illustrate twin injector units which can be used for two intake ports of the engine. The single intake is broken away. In this unit the throats 182 are inclined. A pair of hollow boss extensions 195 and 196 are cast integral with intake stacks, and have an opening 197. The float bowl 142 has an open side and is secured by screws 198 and 199 in a position to close the opening 197. Within the bowl is a float 144 operating a valve in the fuel supply connection. As in previous devices, a vent connection 173 is formed in the bowl cover.

As shown in Fig. 21, the inclined tubes 177 connect with the float bowl through passages 178, and have nozzles 180. Bleed tubes 179 connect with fittings 184 and extend below the fuel level within tubes 177, all as described in Fig. 14. The fuel flow will be equally divided when the same pressure drop occurs across each fuel metering orifice located between the fuel bowl and each nozzle.

Turning now to the intake stack construction used with this invention, more than one specific form for such a device is contemplated. By way of illustration, Figs. 22 to 25 show the details of a modified form of intake stack A for use with the system disclosed in Fig. 3. Parts corresponding to those described in the preceding figures of the drawing are indicated by the same reference characters with 200 added.

In this form the intake stack 235 has a throttle 236 on a shaft 237 journaled in the walls and manually controlled by lever 238. The minimum closed position of the throttle can be adjusted by a set screw 239 threaded in a lug 240 to form an abutment for the lug 241 on arm 238.

Figure 23:
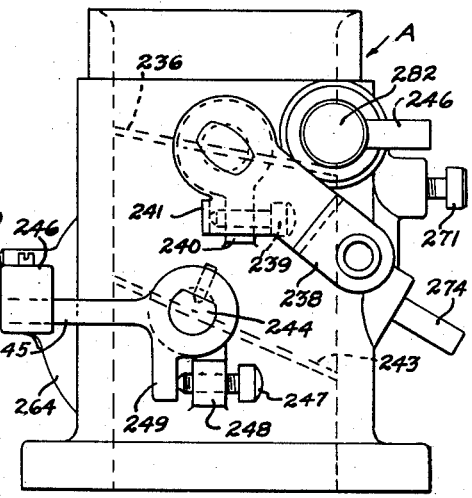
Figure 24:
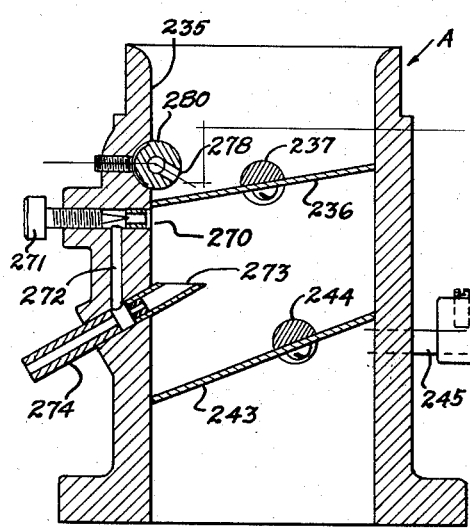
Figure 25:
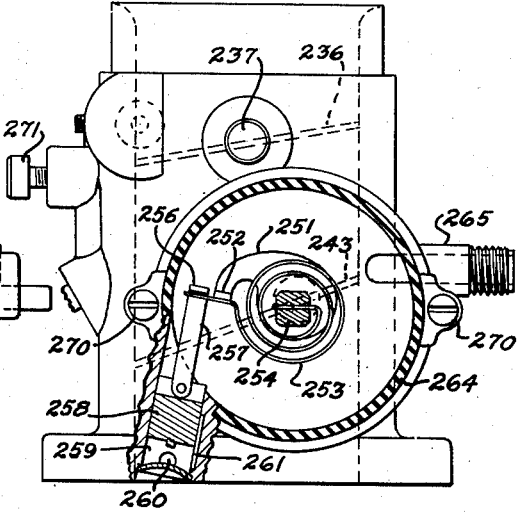

Below the throttle is an unbalanced valve 243 mounted on a shaft 244 also journaled in the stack 235. As shown in Fig. 23, one end of shaft 244 mounts an arm 245 carrying the adjustable weight 246. The closed position of valve 243 may be regulated by a set screw 247 threaded in boss 248 so as to contact lug 249 on the arm 245.

By this construction the resistance of the valve 243 against opening movement in the air stream may be set by moving the weight 246 on the arm. A set screw secures the weight when adjusted. This resistance of the valve creates a differential pressure above and below it at least during its initial stages of movement.

Since the arm 245 is adjustably secured on the shaft 244, its angular relationship to the valve 243 may be changed to give varying rates of change of resistance as the valve moves from one position to another according to the force imposed by the air stream.

The opposite end of shaft 244 rigidly mounts an arm 251 with a finger 252 which bears against an extension of thermostat spring 253. A hook 256 on a link 257 also engages the extension of the thersostat. The link in turn is connected to a piston 258 in a closed cylinder 259. A passage 260 connects the cylinder with a source of suction in the intake stack 235 posterior the throttle 236. The wall of cylinder 259 has a slot 261 which is closed by the piston in its raised position, but which gradually opens as the piston descends to lessen the force on the piston and at the same time cause heated air from a stove or the like to be drawn into the thermostat casing 264 through connection 265. This will cause the spring to be gradually heated and unwind to lessen the resistance imposed on the arm 251 and opening of valve 243. The inner end of the spring is anchored in a slot in a boss 254 on the casing 264. The casing in turn is adjustable for rotation by loosening screws 270.

With this arrangement, when the engine starts, piston 258 will exert pressure on the spring 253 to lessen its resistance to opening movement of valve 243. The heat drawn into the casing 264 will cause spring 253 to unwind until at normal engine operating temperatures the only resistance to valve opening will be the weight 246.

Between the throttle 236 and the valve 243 is a modulating nozzle system for controlling the pressure in the fuel bowls of the injection units. Just below the throttle 236 and disposed at its opening edge is a port 270 controlled by a metering screw 271. Below this port 270 is an upwardly facing ram intake nozzle 273. The nozzle and port are interconnected at 272, and this pressure sensing means has a connection 274 for the fuel bowl vent line 41 or L (Fig. 1 and Fig. 3).

Above the throttle and adjacent its opening edge is a nozzle 278 in tube 280 tangentially disposed in the intake 235. Passage 281 connects with nozzle 278 and has a metering screw 282 threaded in its open end.

The tube 280 may be rotatably adjusted to properly position nozzle 278 and, when adjusted, secured by a set screw 279, or tube 280 can be rotated in synchronism with the throttle 236 by a gearing operated by rotation of throttle shaft 237.

The connection 246 is provided to the bleed of the fuel nozzle, as, for example, the line N or 3N of Fig. 1 and Fig. 3.

Figure 26:
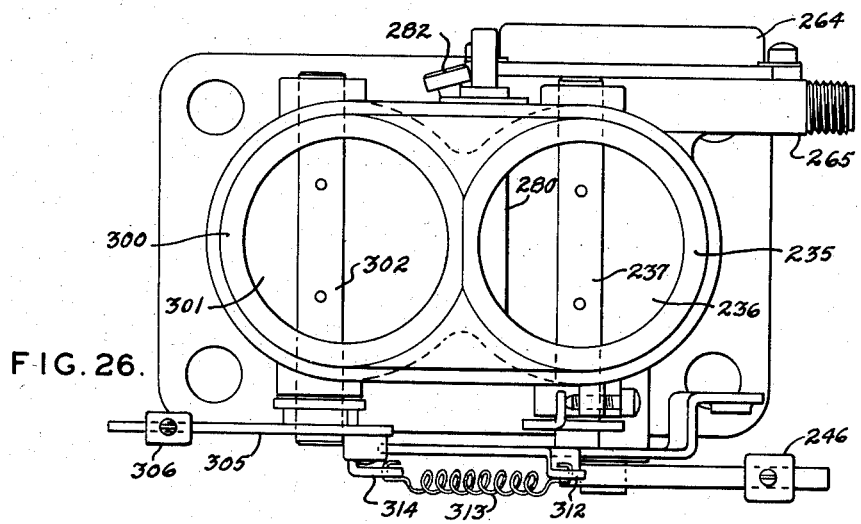
Figs. 26 and 27 are top and side views of another form of intake stack.
Figure 27:
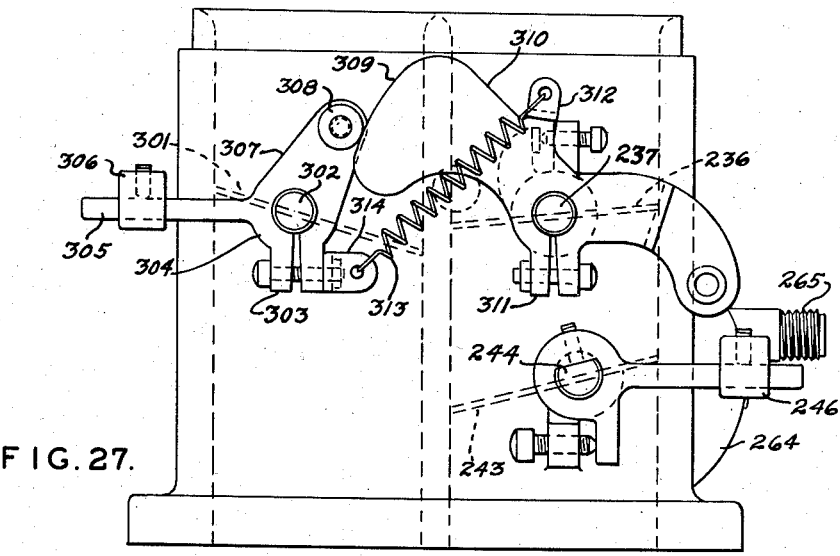

Figs. 26 and 27 show a modified form of intake stack providing a multi-stage throttle control. Similar parts are indicated by the same reference characters as used in Figs. 22–25. This description will be confined to the added structure necessary for multi-stage operation.

In Fig. 26 the primary intake stack 235 is constructed as above described, and mounts the manually controlled throttle 236 on throttle shaft 237. Below the manual throttle is the valve 243 under control of a thermostat in housing 264 and eccentric weight 246. For simplicity, the air metering construction has been omitted.

A second intake stack 300 has an unbalanced valve 301 secured to shaft 302 journaled in the side walls of the stack.

A clamp 303 secures a bellcrank 304 on shaft 302. One arm 305 has an adjustable weight 306 positioned to bias the valve 301 to closed position. The other arm 307 mounts a roller 308 which rides on cam surface 309 of a lever 310 clamped at 311 on the primary throttle shaft 237. Spring 313 connects a lug 312 on lever 310 and a lug 314 on lever 304 to yieldingly urge the roller 308 against the face of cam 309.

During operation, as throttle 236 is opened, cam face 309 will disengage from roller 308 leaving throttle valve 301 free to open by the action of suction. After initial opening, air stream velocity in stack 300 will control the position of throttle 301.

Closing of the manual throttle 236 will positively close throttle 301.

The air intake stacks above described can be modified for use in any of the three systems. Actually, the air intake stacks of Figs. 1, 6, 22, 23, 24, and 25 produce the same result.

Certain structures have been described herein which will fulfill all the objects of the present invention, but it is contemplated that other modifications will be obvious to those skilled in the art which come within the scope of the invention as defined by the appended claims.

We claim:

1. The method of injecting fuel into a pulsating air flow to control the air-to-fuel ratio for combustion in the cylinder of an internal combustion engine comprising the steps of maintaining the fuel level at a predetermined range in an open nozzle exposed to the flow by controlling the rate of fuel flow as a function of combustion air requirements, and raising and lowering the fuel level within the range in response to the pulsating air flow to the individual cylinders to cause a metered amount of fuel to be discharged.

2. The method of injecting fuel from a nozzle into the pulsating stream of air adjacent the intake port of an internal combustion engine to maintain a predetermined air-to-fuel ratio in a cylinder comprising the step of predetermining the range of levels of fuel pulsations in the nozzle by controlling the fuel pressure upstream of a fuel metering restriction in accordance with rate of flow in a substantially steady flow of combustion air.

3. The method of injecting fuel from a nozzle into the pulsating stream of air adjacent the intake port of an internal combustion engine to maintain a predetermined air-to-fuel ratio in each of a plurality of cylinders comprising the step of predetermining the range of levels of fuel pulsations in the nozzles by controlling the fuel pressure upstream and downstream of a fuel metering restriction in accordance with the rate of total air flow to the cylinders.

4. The method of injecting small amounts of fuel from a nozzle with large capacity into the air flow to a cylinder of an internal combustion engine to maintain a predetermined air-to-fuel ratio for power requirements comprising the steps of effecting predetermined ranges of fuel pulsations at levels below the nozzle outlet by regulating the rate of fuel flow to the nozzle, and ejecting small amounts of fuel from the outlet during each pulsation by a jet of air through the outlet from a source of air pressure.

5. The method of carburating an internal combustion engine by injecting fuel from a nozzle to predetermine a ratio of air-to-fuel for combustion according to varying engine power requirements under varying ambient air conditions, comprising the step of bouncing the fuel in the nozzle above and below mean fuel levels maintained by controlling the rate of fuel flow to the nozzles as a function of said variables in timed relation to a pulsating stream of air.

6. The method of carburating an internal combustion engine by injecting fuel from a nozzle into the air flow to a cylinder, to predetermine a ratio of air-to-fuel for combustion in the cylinder according to power requirements on the engine under varying ambient air conditions, comprising the steps of raising the fuel in a nozzle in synchronism with each pulse of air into the cylinder, picking off the fuel from the nozzle during the period of maximum velocity of each pulse of the air stream, and terminating the injection at varying intervals after the pulse has passed maximum velocity as determined by a function of the variables of load and air conditions.

7. The method of carburating an internal combustion engine by injecting fuel from a nozzle into the air flow to a cylinder, to predetermine a ratio of air to fuel for combustion in the cylinder according to power requirements on the engine under varying ambient air conditions, comprising the steps of impressing on the fuel in a nozzle a differential pressure to cause injection of a fuel charge to the cylinder in synchronism with and proportional to the velocity of each pulse of air into the cylinder, timing the injection to begin before the velocity in the air stream has reached a maximum, and then terminating the injection at varying intervals as determined by a function of the variables of load and air conditions.

8. The method of carburating in internal combustion engine by injecting fuel from a nozzle into the air flow to a cylinder, to pretermine a ratio of air-to-fuel for combustion in the cylinder according to power requirements on the engine under varying ambient air conditions, comprising the steps of impressing on the fuel in a nozzle pressures to cause injection to the cylinder in synchronism with each pulse of air into the cylinder, timing the injection to begin during the interval of the pulse when velocity in the air stream is near maximum, by a function of the variables of load and air condition, and then terminating the injection by back pressure caused by engine intake port closing.

9. The method of injecting fuel from an open nozzle to the cylinder of an internal combustion engine to establish an air-to-fuel ratio for each engine requirement comprising the step of intermittently decreasing the pressure at the nozzle opening to eject the fuel and subjecting the fuel supply to the nozzle to reduced pressure to terminate the ejection.

10. The method of injecting fuel from a nozzle to the cylinder of an internal combustion engine to establish an air-to-fuel ratio for each engine requirement comprising the steps of applying a fluctuating pressure at the nozzle to eject the fuel therefrom and applying an opposite acting pressure on the fuel supplied to the nozzle to terminate the ejection.

11. The method of carburating a plurality of cylinders from a plurality of nozzles to establish air-to-fuel ratios for each cylinder according to engine requirements comprising the steps of applying a fluctuating pressure to the fuel in each nozzle to eject the fuel therefrom and applying an opposite acting pressure on the fuel supplied to the nozzle to terminate the ejection.

12. The method of injecting fuel to the separate cylinders of an internal combustion engine from a separate nozzle of large capacity for each cylinder to determine ratios of air-to-fuel for combustion in each cylinder over a wide range according to varying engine power requirements measured as a function of varying ambient air conditions and manifold pressures comprising the steps of effecting predetermined ranges of fuel pulsations from mean fuel levels in the nozzle to extremes above and also below the nozzle outlet as determined by said variables in timed relation to a pulsating stream of air to each cylinder and ejecting small amounts of fuel from said outlet during each pulsation by a jet of air from a source of positive air pressure when at ranges below the nozzle outlet.

13. The method of injecting fuel to the separate cylinders of an internal combustion engine from a separate nozzle of large capacity for each cylinder to determine ratios of air-to-fuel for combustion in each cylinder over a wide range according to varying engine power requirements measured as a function of varying ambient air conditions anterior to a throttle means and manifold pressures, comprising the steps of effecting predetermined ranges of fuel pulsations from mean fuel levels in the nozzle to extremes above and also below the nozzle outlet as determined by said variables in timed relation to a pulsating stream of air to each cylinder and ejecting small amounts of fuel from said outlet during each pulsation by a jet of air from a source of positive air pressure when at ranges below the nozzle outlet.

14. The method of injecting fuel from a plurality of open nozzles to a plurality of engine cylinders to establish an air-to-fuel ratio for each engine requirement comprising the step of decreasing the pressure in the vicinity of the open nozzles to initiate ejection of fuel therefrom and then terminating the ejection by decreasing the pressure acting on the fuel supply for the nozzle.

15. The method of injecting fuel from an open nozzle at the intake port to the cylinder of an internal combustion engine to establish an air-to-fuel ratio for each engine requirement comprising the step of producing a first pressure differential between the cylinder and the fuel at the nozzle opening to eject fuel and then terminating the ejection by reversing the existing pressures acting on the fuel to produce a second pressure differential acting on the fuel in the opposite sense, said pressures being a function of static and dynamic pressures anterior and posterior of the engine throttle.

16. In an internal combustion engine having valve controlled intake ports, a manifold for supplying air to each of said ports, an open fuel nozzle for each port, fuel in each nozzle being exposed to the pulsations in said manifold adjacent said port, a fuel supply for said nozzles a common source of air for said manifold, a manually operated throttle valve at said source, and means adjacent said throttle valve connected to said fuel supply and responsive to air flow produced by throttle positions to produce pressures acting on said supply for controlling the ejection of fuel from each nozzle to establish an air-to-fuel ratio for each engine requirement.

17. In an internal combustion engine having valve controlled intake ports, a manifold for supplying air for each of said ports, a common source of air for said manifold, an open fuel nozzle for each of said ports, means supplying fuel to each nozzle and exposed to the pulsations in said manifold adjacent said port, a throttle valve at said source, and means exposing the fuel in said nozzles to ambient air condition adjacent said throttle valve for controlling the ejection of fuel from said nozzles.

18. In an internal combustion engine having valve controlled intake ports, a manifold having an induction tube for each port, a fuel nozzle positioned in each induction tube adjacent each port, and exposed to the pulsations in said tube adjacent said port, a fuel supply for each fuel nozzle, a fuel flow metering means for each fuel nozzle, said manifold having a common air inlet for said tubes, a manually operated throttle in said inlet for controlling the flow of air to said ports, and pressure responsive means adjacent said throttle valve exposed to the combined pulsations in said tubes and connected to said metering means to effect changes in the rate of fuel flowing continuously to said nozzles for controlling the intermittent ejection of fuel from said nozzles to establish an air-to-fuel ratio for each engine requirement.

19. In combination an internal combustion engine having valve controlled intake ports, and an injection type carburetor for supplying fuel to said ports individually in timed relation to the operation of said valves, comprising a plurality of tubes for said ports, a common air inlet for said tubes, a throttle for said inlet, and a fuel nozzle for each tube, means to supply fuel to the nozzles and means acting on said supply to pump the fuel from the nozzles at a rate of flow proportional to the degree of throttle opening and to air pressures in said tubes adjacent each nozzle.

20. In combination an internal combustion engine having valve controlled intake ports, and an injection type carburetor for supplying fuel to said ports individually in timed relation to the operation of said valves, comprising a plurality of tubes for said ports, a common air inlet for said tubes, a throttle for said inlet, and a fuel nozzle for each tube, means acting in timed relation to said valves to pump fuel from said nozzles and including a first metering means responsive to air pressures at spaced intervals along the tubes to control said pumping means, a means to supply fuel to said pumping means, and a second metering device in said fuel supply to replace the amount of fuel ejected from each nozzle.

21. In combination an internal combustion engine having valve controlled intake ports, and an injection type carburetor for supplying fuel to said ports individually in timed relation to the operation of said valves, comprising a plurality of tubes for said ports, a common air inlet for said tubes, a throttle for said inlet, and a fuel nozzle for each tube, means acting in timed relation to said valves to pump fuel from said nozzles and means responsive to air pressures in said tubes acting to meter the fuel ejected, including a presure control responsive to air pressures adjacent said throttle, means to supply fuel to said nozzles, and a metering device in said fuel supply for each nozzle acted upon by said pressure control to replace the amount of fuel ejected from each nozzle.

22. In combination an internal combustion engine having valve controlled intake ports and an injection type carburetor for supplying fuel to said ports individually in timed relation to the operation of said valves, comprising a plurality of tubes for said ports, a common air inlet for said tubes, an air metering means at said inlet, fuel nozzles for the tubes, means acting in timed relation to said valves to pump fuel from said nozzles, means acting to control fuel pressure to meter the fuel pumped and responsive to said air metering means, and means to supply fuel to the nozzles.

23. In combination an internal combustion engine having valve controlled intake ports and an injection type carburetor for supplying fuel to said ports individually in timed relation to the operation of said valves, comprising a plurality of tubes for said ports, a common air inlet for said tubes, an air metering means at said inlet, fuel nozzles for the tubes, means acting in timed relation to said valves to pump fuel from said nozzles, means acting to control fuel pressure to meter the fuel pumped and responsive to said air metering means, means to supply fuel to the nozzles, and a fuel metering device in said supply to replace the amount of fuel pumped from each nozzle.

24. In combination an internal combustion engine having valve controlled intake ports and an injection type carburetor for supplying fuel to said ports individually in timed relation to the operation of said valves, comprising an air inlet stack, an air metering means in said stack, a plurality of fuel injection units between the ports and the stack, comprising an airflow actuated pump and a fuel nozzle, a fuel reservoir connected to said nozzle, and means to oppose the action of said pump, including a connection from the nozzle to the stack.

25. In combination an internal combustion engine having valve controlled intake ports and an injection type carburetor for supplying fuel to said ports individually in timed relation to the operation of said valves, comprising an air inlet stack, an air metering means in said stack, a plurality of fuel injection units between the ports and the stack, comprising an airflow actuated pump and a fuel nozzle, and means to control the density of fuel ejected from the nozzle by mixing air with fuel, comprising a connection between said nozzle and a source of air under pressure.

26. In a device for mixing air and fuels, a plurality of air induction tubes, a plurality of fuel nozzles for the tubes, a common source of air for the tubes, a mechanically operated throttle valve at said source, and a fuel metering device connected with the nozzle and with said source adjacent said valve.

27. In a device for mixing air and fuel for an engine having valve controlled intake ports, a manifold for supplying air to said ports, a fuel nozzle adjacent each of said ports, a fuel supply for said fuel nozzles, a throttle valve for controlling the flow of air to said ports, and means responsive to air pressures adjacent said throttle valve for controlling the density of fuel spray ejected from said nozzles by mixing air with the fuel.

28. In a device for mixing air and fuel for an engine having valve controlled intake ports, a manifold for supplying air to said ports, a fuel nozzle for each port, a fuel supply for said fuel nozzles, a throttle valve for controlling the flow of air to each port, an air operated fuel pump, and means adjacent said throttle valve responsive to air flow effects produced by throttle positions for controlling the duration of fuel ejection from said nozzles.

29. In a device for mixing air and fuel for an engine having valve controlled intake ports, a manifold for supplying air to said ports, a fuel nozzle for each port, a fuel supply for said nozzles, a throttle valve for controlling the flow of air to said ports, means adjacent said throttle valve responsive to air flow effects produced by throttle positions for controlling the duration of fuel ejection from said nozzles, and additional means adjacent said throttle valve responsive to air flow effects produced by throttle positions for controlling the density of fuel spray ejected from said nozzles.

30. In a device for mixing air and fuel to form a combustible mixture, for a multi-cylinder internal combustion engine, a plurality of air induction tubes, a fuel nozzle positioned at the extremity of each tube, a common source of air for said tubes, a mechanically operated throttle valve at said source, a fuel supply for each nozzle, and a fuel metering means controlling the fuel flow from said supply to each nozzle connected to said source adjacent said valve and connected to each nozzle for controlling the amount of fuel ejected from said nozzles.

31. In a device for mixing air and fuel for a multi-cylinder internal combustion engine, a manifold having an induction tube for each cylinder, a fuel nozzle positioned at the extremity of each induction tube and exposed to the pulsations therein, a common source of air for said tubes, a mechanically operated throttle valve at said source, and means responsive to air pressures adjacent said throttle for controlling the ejection of fuel from said nozzles in timed relation to the pulsations adjacent the respective nozzles.

32. A carburetor comprising an induction stack, a throttle in the stack, a plurality of branches from the stack and a combined airflow actuated pump and fuel nozzle interconnected between each branch and an engine intake port.

33. A carburetor comprising an induction stack, a throttle in the stack, a plurality of branches from the stack and a fuel injection unit for each branch, comprising a combined fuel nozzle and venturi pump interconnected between each branch and an engine intake port, a fuel reservoir connected to the nozzle, and valve means in the reservoir to control the fuel supply to said nozzle.

34. A carburetor comprising an induction stack, a throttle in the stack, a plurality of branches from the stack for connection with engine intake ports, and a fuel injection unit for each branch, comprising a combined venturi pump and fuel nozzle interconnected between each branch and an engine intake port, a fuel reservoir connected to said nozzle, and means to oppose the action of said pump including a pressure connection from the reservoir to the stack.

35. A carburetor comprising an induction stack, a throttle in the stack, a plurality of branches from the stack for connection with engine intake ports, and a fuel injection unit for each branch, comprising a combined venturi pump and fuel nozzle, a fuel reservoir for said nozzle, and means to control density of the fuel pumped by mixing air therewith to form a spray, comprising a connection between said nozzle and a source of air under pressure.

36. A fuel injection unit for use in the system above described, comprising a fuel reservoir, a fuel nozzle connected therewith, an airflow actuated pump for fuel in the nozzle, an air pressure connection to the nozzle downstream from said reservoir, and an air pressure connection with the unit for controlling the range of fuel levels in the nozzle produced by said pump.

37. A fuel injection unit for use in the system above described, comprising a fuel reservoir, a fuel nozzle connected therewith, an airflow actuated pump for fuel in the nozzle, an air pressure connection to the nozzle downstream from said reservoir, and an air pressure connection with the unit for controlling the range of fuel levels in the nozzle produced by said pump, and a screen mounted upstream of said pump to straighten the air flow therethrough and to intercept reverse flow of the fuel.

38. The method of injecting fuel to the separate cylinders of an internal combustion engine from separate fuel nozzles in a manner to determine ratios of air-to-fuel suitable for combustion in said cylinders according to varying engine power requirements measured as a function of throttle opening, engine manifold pressure, engine temperature and engine speed comprising the steps of controlling fuel pressure according to air pressures proportional to those anterior and posterior said throttle applied directly to the fuel and synchronizing the flow from said nozzles with the pulsating stream of air for each cylinder.

39. The method of injecting small amounts of fuel and air from a nozzle opening posterior of the engine throttle and at the intake for a cylinder of an internal combustion engine to atomize the fuel and maintain a predetermined air-to-fuel ratio comprising the steps of applying air pressures proportional to the rate of air flow to the engine, and greater than the air pressures at the intake of the cylinder, to oppose fuel flow in the nozzle to control the fuel supply, and ejecting fuel from the nozzle opening by the high velocity in the air escaping from the nozzle.

40. The method as defined in claim 39 including the step of varying the pressure applied in accordance with throttle position and manifold pressure.

41. A device for supplying fuel and air to an internal combustion engine comprising a conduit, a fuel nozzle in said conduit, a source of fuel for said nozzle, a restriction between said nozzle and said source a movable throttle anterior said nozzle, a pressure sensing means adjacent said throttle constructed and arranged to form a variable restriction with said movable throttle and connected to said nozzle, and means for controlling the pressure drop across said restriction in accordance with pressures sensed by said pressure sensing mean.

42. In a fluid metering device having an air inlet conduit, the combination of a manually operated valve in said conduit, a flow responsive valve spaced upstream from said first valve operated by air flow in said conduit, and flow sensing means adjacent said valves constructed and arranged to be responsive to measure static and dynamic pressures during the entire range of valve operation.

43. The method of metering fuel flow from a nozzle located in an engine air induction system between an air throttle valve and an engine intake port to obtain an air-to-fuel ratio for an engine operating condition comprising the step of varying the pressure drop across a fuel metering orifice by applying air pressure on the fuel upstream of a fuel metering orifice acting to create fuel flow, and downstream of the said orifice to retard the fuel flow through said orifice, and then regulating the air pressures applied to the fuel to create a differential in pressures related to engine demand for fuel.

44. An engine fuel charging device comprising, in combination, a conduit adapted for connection at one end to the intake port of an engine, a throttle valve in said conduit, a source of fuel under positive pressure, a fuel nozzle connected to said source and extending into said conduit downstream of said throttle valve, a fuel metering restriction for controlling the flow of fuel from said nozzle, an outlet for said nozzle exposed to suction between said throttle and said intake port, and means for modulating the effect of suction on the fuel downstream of said restriction, including a passage between said nozzle and a source of air at pressure substantially equal to fuel pressure in said source for controlling the fuel pressure downstream of said restriction by acting on the fuel in a direction opposed to the direction of fuel flow from the nozzle and thereby metering the fuel flow to said outlet.

45. An engine fuel charging device comprising, in combination, a conduit adapted for connection at one end to the intake port of an engine, a throttle valve in said conduit, a source of fuel under positive pressure, a fuel nozzle connected to said source and extending into said conduit downstream of said throttle valve, a fuel metering restriction for controlling the flow of fuel from said nozzle, an outlet for said nozzle exposed to suction between said throttle and said intake port, and means for regulating the pressure drop across said restriction, including a plurality of sensing means for measuring static and dynamic air pressure upstream and downstream of said throttle, passages connecting said sensing means, and means for controlling the fuel pressure downstream of said metering restriction in accordance with variations in the air pressure sensed by applying an air pressure through one of said passages to the fuel in the nozzle in a direction opposed to the direction of fuel flow from the nozzle.

46. An engine fuel charging device comprising, in combination, a conduit adapted for connection at one end to an engine intake port, a throttle valve in said conduit, a source of fuel, a fuel nozzle tube connected to said source and extending into said conduit downstream of said throttle, an outlet for said nozzle tube in said conduit, and a passage extending from said outlet opposite said source to said conduit upstream of said throttle to apply a back pressure on the fuel in said nozzle.

47. An engine fuel charging device comprising, in combination, a conduit adapted for connection at one end to an intake port of an engine, a variable area restriction in said conduit, a source of fuel, a fuel nozzle tube connected to said source and extending into said conduit downstream of said variable area restriction, an outlet for said fuel nozzle tube in said conduit, and a passage extending from said nozzle outlet opposite said source to said variable area restriction for controlling the fuel pressure at said outlet.

48. An engine fuel charging device comprising, in combination, a conduit for connection at one end to an engine intake port, a throttle valve in said conduit, a source of fuel, a fuel nozzle tube connected to said source and extending into said conduit downstream of said throttle valve, an outlet for said nozzle tube in said conduit, a passage extending from said outlet opposite said source to said conduit upstream of said throttle to regulate the flow of fuel in said nozzle, and a flow responsive air valve in said conduit upstream of the connection of said passage with said conduit.

49. An engine fuel charging device comprising, in combination, a plurality of conduits adapted for connection at one end to the intake port of an engine, a throttle valve for said conduits, a source of fuel, fuel nozzles connected to said source of fuel and extending into said conduits downstream of said throttle valve, outlets for each said nozzle in each said conduit, and passages extending from each said nozzle outlet to said conduit upstream of said throttle to apply equal back pressures on the fuel in each said nozzle so as to divide the flow equally between said nozzles.

50. In an engine fuel charging device having a conduit fully open at its inlet end and adapted for connection at one end to the intake port of the engine, a pivoted throttle valve in said conduit and a shaft extending transversely of said conduit mounting said throttle, the combination of an air flow sensing device comprising an apertured tube extending transversely of said conduit and eccentrically arranged with respect to said conduit substantially parallel with said shaft so as to form a restriction to air flow past said throttle which is variable with throttle movement about its pivot.

51. In a device for mixing air and fuel to form a combustible mixture for a multi-cylinder internal combustion engine, a plurality of air induction tubes, a fuel nozzle positioned adjacent the extremity of each tube and exposed to the pulsations therein, a common source of air for said tubes, a throttle valve at said source, a source of fuel for each nozzle, fuel metering restrictions between said source of fuel and each said nozzle, an air pressure line connected at the downstream side of each of said fuel metering restrictions, and air flow measuring means adjacent said throttle for controlling the pressures in each of said lines to be equal to maintain equal flow from said nozzles.

52. An engine charging device comprising, in combination, an air induction system for the engine having an air chamber with a plurality of branch conduits adapted for connection to the intake ports of the engine, an air inlet for said chamber, a throttle in said inlet, a source of fuel, restricted fuel outlets in said branch conduits downstream of said throttle discharging fuel into said branch conduits adjacent the intake ports of the engine, a connection between said restricted outlets and said source of fuel to supply fuel thereto, fuel metering restrictions of substantially equal flow capacity in said connections between said source and said restricted outlets, a connection between said air inlet upstream of said throttle and each of said connections between each of said restricted outlets and each of said metering restrictions applying equal air pressure downstream of each of said metering restrictions to maitnain an equal pressure drop across each of said fuel metering restrictions and thereby an equal fuel flow through each of said fuel metering restrictions to said restricted outlets, and means for regulating the flow of air through said connection to vary the air pressure downstream of each of said fuel metering restrictions.

53. An engine charging device comprising, in combination, an air induction system for the engine having an air chamber with a plurality of branch conduits adapted for connection to the intake ports of the engine, an air inlet for said chamber, a throttle in said inlet, a source of fuel, restricted fuel outlets in said branch conduits downstream of said throttle discharging fuel into said branch conduits adjacent the intake ports of the engine, a connection between said restricted outlets and said source of fuel to suplpy fuel thereto, fuel metering restrictions of substantially equal flow capacity in said connections between said source and said restricted outlets, air passages connected at the downstream side of each of said fuel metering restrictions to maintain an equal air pressure downstream of each of said fuel metering restrictions, and means for regulating the flow of air through said air passages to vary the air pressure downstream of each of said fuel metering restrictions.

54. A fuel metering system for an internal combustion engine having a throttle controlled air passage for supplying air to the engine comprising, in combination, a source of fuel, a fuel passage connecting said source of fuel with said engine, a fuel metering restriction in said fuel passage, air passages connecting with said fuel passage at spaced locations upstream and downstream in the direction of fuel flow through said fuel metering restriction, respectively, and means for regulating the flow of air in one of said air passages to control the pressure differential across said fuel metering restriction and thereby the rate of fuel flow to the engine.

References Cited in the file of this patent

UNITED STATES PATENTS

| | | |
|---|---|---|
| 1,199,567 | Kellogg et al. | Sept. 26, 1916 |
| 1,911,135 | Aseltine | May 23, 1933 |
| 1,978,660 | Wynne et al. | Oct. 30, 1934 |
| 2,033,211 | Tice | Mar. 10, 1936 |
| 2,153,047 | Leibing | Apr. 4, 1939 |
| 2,252,955 | Woods | Aug. 19, 1941 |
| 2,328,764 | Wirth | Sept. 7, 1943 |
| 2,428,377 | Morris | Oct. 7, 1947 |
| 2,511,213 | Leslie | June 13, 1950 |
| 2,538,281 | Snyder | Jan. 16, 1951 |
| 2,681,214 | Eickmann | June 15, 1954 |